(12) United States Patent
Taka et al.

(10) Patent No.: US 8,074,236 B2
(45) Date of Patent: Dec. 6, 2011

(54) DISK DRIVE DEVICE AND ELECTRONIC APPARATUS

(75) Inventors: Yoshiteru Taka, Kanagawa (JP); Kiyoaki Tsuji, Kanagawa (JP)

(73) Assignee: Sony Optiarc Inc., Tokyo (JP)

(*) Notice: Subject to any disclaimer, the term of this patent is extended or adjusted under 35 U.S.C. 154(b) by 345 days.

(21) Appl. No.: 12/496,229

(22) Filed: Jul. 1, 2009

(65) Prior Publication Data
US 2010/0050191 A1 Feb. 25, 2010

(30) Foreign Application Priority Data

Aug. 22, 2008 (JP) ................................. 2008-214502
Aug. 22, 2008 (JP) ................................. 2008-214503

(51) Int. Cl.
G11B 17/04 (2006.01)
(52) U.S. Cl. ...................................................... 720/623
(58) Field of Classification Search .................... 720/623
See application file for complete search history.

(56) References Cited

U.S. PATENT DOCUMENTS

| 7,231,645 | B2 | 6/2007 | Hirano et al. | |
| 7,322,036 | B2* | 1/2008 | Hirano et al. | 720/621 |
| 2005/0060727 | A1* | 3/2005 | Hirano et al. | 720/622 |
| 2006/0190949 | A1* | 8/2006 | Shimomae | 720/621 |

FOREIGN PATENT DOCUMENTS

JP 3867692 10/2006

* cited by examiner

Primary Examiner — Mark Blouin
(74) Attorney, Agent, or Firm — Oblon, Spivak, McClelland, Maier & Neustadt, L.L.P.

(57) ABSTRACT

A disk drive device includes: a device body having a front surface that forms a disk insertion and ejection opening; a pair of arms supported at proximal end portions thereof pivotally from the front surface of the device body to a downstream side in a disk insertion direction; transport rollers respectively rotatably supported at distal ends of the arms and transporting the disk to an inside or outside of the device body by being brought into contact with a side surface of a disk; an urging member urging the arms so that the transport rollers supported respectively by the arms approach each other; and a transport roller rotation mechanism driving at least one of the transport rollers, supported respectively by the arms, for rotation, wherein the arms synchronously pivot the transport rollers in such a manner that the pivotally supported proximal end portions are coupled to each other.

10 Claims, 28 Drawing Sheets

DISK DRIVE DEVICE AND ELECTRONIC APPARATUS

BACKGROUND OF THE INVENTION

1. Field of the Invention

The invention relates to a disk drive device equipped with a transport mechanism that transports disks having large and small different diameters and, more particularly, to a so-called a slot-in type disk drive device that automatically loads a disk into a device body only by inserting the disk into an insertion opening and an electronic apparatus that uses the disk drive device.

2. Description of the Related Art

A typical optical disk includes an optical disk, such as a CD (Compact Disk), a DVD (Digital Versatile Disk) and a BD (Blue-ray Disk), and a magneto-optical disk, such as an MO (Magneto optical) disk and an MD (Mini Disk). Various disk drive devices that are compatible with these disks, disk cartridges, and the like, are available.

The disk drive devices include a type in which a lid or a door provided for a casing is opened and a disk is directly mounted on a turn table that is accessed through the lid or the door, a type in which a disk is placed on a disk tray that horizontally moves into or out from a casing to automatically load the disk onto a turn table inside the casing when the disk tray is drawn into the casing, a type in which a disk is directly mounted on a turn table provided for a disk tray, and the like. However, in any type, it may be necessary for an operator to open or close a lid or a door, to move a disk tray in or out or mount a disk on a turn table.

In contrast, there is a so-called slot-in type disk drive device that automatically mounts a disk on a turn table only by inserting the disk from a disk insertion and ejection opening provided on the front surface of the casing. The slot-in type disk drive device is mainly classified into three types.

The first type includes a plurality of pivot arms of which support portions that support a side surface portion inserted from a disk insertion and ejection opening are provided at distal ends and proximal end portions are pivotably supported, and performs a loading action in which these pivot arms are pivoted in a plane parallel to a disk while drawing the disk from the disk insertion and ejection opening into the casing and an ejecting action in which a disk is ejected from the disk insertion and ejection opening to the outside of the casing. Most of this type is generally used in a slimmed mobile device, such as a notebook personal computer. However, it does not initiate drawing action until the maximum diameter portion or more of a disk is inserted in a device body, so this type is avoided in general home appliances.

The second type includes a pair of opposite guide rollers that hold surfaces of a disk inserted from a disk insertion and ejection opening, and performs a loading action in which the disk inserted from the disk insertion and ejection opening is drawn into a casing by rotating these pair of guide rollers in opposite directions and an ejecting action in which the disk is ejected from the disk insertion and ejection opening to the outside of the casing. Most of this type is generally used in an in-vehicle disk drive device that ensures a predetermined mounting space. Insertion and ejection of a disk may be smoothly performed; however, because rubbers of the rollers contact the surfaces of the disk, there is a possibility that a recording surface may be damaged after an extended period of use.

The third type, for example, as shown in FIG. 26, includes arms that are pivotably supported in a plane parallel to a disk, rubber rollers that are rotatably provided at distal ends of the arms, and rotation mechanisms of the rubber rollers. Then, the rubber rollers roll on the side surface portion of the disk to perform drawing and ejecting actions while holding the disk. This type is used in a home-use DVD player and a game machine. Because a disk insertion feeling is relatively smooth, and it is less likely to affect a recording surface of the disk, this type is particularly effective for disks having high recording density (see Japanese Patent No. 3867692).

In this third type, the pair of arms are supported at both sides of a disk insertion opening, so the rubber rollers that support the side surface portion of the disk are pivoted to a substantially middle in the disk insertion opening of the device body. As the rubber rollers are pivoted toward a far side, they are pivoted toward left and right side surfaces of the casing. Thus, in the above slot-in type disk drive device, as shown in FIG. 27A and FIG. 27B, an amount by which a disk is projected from the device body at the time when the disk is ejected is insufficient. Particularly, as shown in FIG. 27B, when a 8-cm disk is ejected, a recording surface tends to be touched. This causes degradation of recording and reproducing quality.

In addition, in the above slot-in type disk drive device, the pivot fulcrums of the arms are provided at both sides of the disk insertion opening. Thus, when another mechanism, such as a double insertion prevention mechanism for a disk, is provided at a front surface side of the device body as well, a degree of freedom of technical design is small. In addition, a degree of freedom of appearance design at the front surface of the device body is also limited.

In the disk drive device of a type described in Japanese Patent No. 3867692, as shown in FIG. 28, the pair of arms provided with the rubber rollers are pivotably supported at both sides of the disk insertion opening provided at the front surface of the device body, and the rubber rollers are urged in a direction to approach each other to support the side surface portion of the disk. Here, the pair of arm members are supported at an interval at both sides of the disk insertion opening, so it is difficult for the arm members to be directly coupled to each other. Urging members are provided for the respective arm members to urge the arm members in a direction to approach each other, and hold the disk by substantially equal urging forces. Thus, as the urging forces of the urging members vary because of component tolerance, aging, and the like, the left and right urging forces become unbalanced. Therefore, there is a possibility that transport of a disk may be unstable.

In addition, it is necessary for the disk drive device to perform centering to oppose a disk center hole to a turn table in order to mount the disk inserted into the device body onto the turn table to be driven for rotation. In addition, even when any disks having large and small different diameters are inserted, it is necessary for a centering member to synchronize with the pivot of the pair of arms in order to oppose the respective disk center holes to the turn table. Here, the centering member is arranged at the back surface side of the device body, and it is difficult for the centering member to be directly coupled to the pair of arms, so the centering member is coupled to the pair of arms via intermediate gears. Thus, the disk drive device uses a mediating member, such as intermediate gears, so the number of components is increased. In addition, by ensuring a space for arranging these components, the size and weight of the device body increase. Furthermore, as a result of coupling these components, rattling of each mediating member accumulates, and, therefore, there is a possibility that inconvenience, such as unstable operation, may occur.

SUMMARY OF THE INVENTION

It is desirable to provide a disk drive device that inserts or ejects a disk using arms equipped with rubber rollers, supporting a side surface of the disk, at distal ends and that sufficiently ejects even a small-diameter disk and of which a front surface side of a device body allows a degree of freedom of mechanism design, and to provide an electronic apparatus that uses the disk drive device.

It is also desirable to provide a disk drive device that stably operates a pair of arms that transport a disk and that reliably couples the pair of arms to a centering member, and to provide an electronic apparatus that uses the disk drive device.

According to an embodiment of the invention, a disk drive device includes: a device body having a front surface that forms a disk insertion and ejection opening, a disk being inserted to or ejected from the front surface; a pair of arms that are supported at proximal end portions thereof pivotally from the front surface of the device body to a downstream side in a disk insertion direction in which the disk is inserted; transport rollers that are respectively rotatably supported at distal ends of the pair of arms and that transport the disk to an inside or outside of the device body by being brought into contact with a side face of the disk; an urging member that urges the pair of arms so that the transport rollers supported respectively by the pair of arms approach each other; and a transport roller rotation mechanism that drives at least one of the transport rollers, supported respectively by the pair of arms, for rotation, wherein the pair of arms synchronously pivot the transport rollers in such a manner that the pivotally supported proximal end portions are coupled to each other.

According to another embodiment of the invention, an electronic apparatus includes: an apparatus body on which a disk drive device is mounted, wherein the disk drive device includes a device body having a front surface that forms a disk insertion and ejection opening, a disk being inserted to or ejected from the front surface; a pair of arms that are supported at proximal end portions thereof pivotally from the front surface of the device body to a downstream side in a disk insertion direction in which the disk is inserted; transport rollers that are respectively rotatably supported at distal ends of the pair of arms and that transport the disk to an inside or outside of the device body by being brought into contact with a side face of the disk; an urging member that urges the pair of arms so that the transport rollers supported respectively by the pair of arms approach each other; and a transport roller rotation mechanism that drives at least one of the transport rollers, supported respectively by the pair of arms, for rotation, wherein the pair of arms synchronously pivot the transport rollers in such a manner that the pivotally supported proximal end portions are coupled to each other.

According to further another embodiment of the invention, a disk drive device includes: a device body having a front surface that forms a disk insertion and ejection portion, a disk being inserted to or ejected from the front surface; a pair of arms that are supported at proximal end portions thereof pivotally from the front surface of the device body to a downstream side in a disk insertion direction in which the disk is inserted; and a centering member that is pivotally supported at the downstream side in the disk insertion direction and that centers the disk, wherein the pivotally supported proximal end portions of the pair of arms are coupled to each other, and the centering member is coupled to at least any one of the pair of arms.

According to yet another embodiment of the invention, an electronic apparatus includes: an apparatus body on which a disk drive device is mounted, wherein the disk drive device includes a device body having a front surface that forms a disk insertion and ejection portion, a disk being inserted to or ejected from the front surface; a pair of arms that are supported at proximal end portions thereof pivotally from the front surface of the device body to a downstream side in a disk insertion direction in which the disk is inserted; and a centering member that is pivotally supported at the downstream side in the disk insertion direction and that centers the disk, wherein the pivotally supported proximal end portions of the pair of arms are coupled to each other, and the centering member is coupled to at least any one of the pair of arms.

According to the embodiment of the invention, the pair of arms are supported at the downstream side in the disk insertion direction of the device body, and the transport rollers that support the outer peripheral surface of the disk are pivoted toward the front surface of the device body. Thus, whichever a large-diameter disk or a small-diameter disk is inserted, it is possible to reliably eject the disk to the position at which the center hole of the disk is placed outside the device body.

In addition, according to the embodiment of the invention, the pair of arms are coupled at the downstream side in the disk insertion direction of the device body, and the transport rollers that support the outer peripheral surface of the disk are pivoted frontward or backward of the device body. This reduces a region of the front surface side of the device body in which the transport rollers pivot, and it is possible to ensure a space. That is, according to the embodiment of the invention, the region of the front surface side of the device body in which the transport rollers pivot is made minimal. Thus, both sides of the front surface may be freely designed. This may, for example, allow arrangement of another component or may increase the degree of freedom of design of an electronic apparatus to which the device body is assembled.

According to the embodiment of the invention, the proximal end portions of the arms are coupled to each other and are synchronously pivoted to support the outer periphery of the disk equally, and are able to advance the disk in the insertion direction of the device body. In addition, according to the embodiment of the invention, the centering member is engaged with any one of the proximal end portions of the arms. Thus, the centering member is rotated in synchronization with the pivot of the arms. Thus, according to the embodiment of the invention, it is not necessary to interpose an intermediate member between the arms and the centering member, so the number of components and the size and weight of the device body are not increased. In addition, according to the embodiment of the invention, without causing rattling due to accumulation of manufacturing tolerance, assembling tolerance, or the like, of a mediating member, it is possible to pivot the centering member in synchronization with the pivot of the arms.

BRIEF DESCRIPTION OF THE DRAWINGS

FIG. 5A and FIG. 5B are views that show a state where a first switch is depressed, in which FIG. 5A is a plan view in an insertion waiting state, and FIG. 5B is a plan view immediately after an optical disk is inserted;

FIG. 6A and FIG. 6B are views that show a state where a second switch is depressed, in which FIG. 6A is a plan view that shows a state where a large-diameter disk is inserted, and FIG. 6B is a plan view that shows a state where a small-diameter disk is inserted;

FIG. 11A and FIG. 11B show the drive mechanism, in which FIG. 11A is a plan view of the drive mechanism in a process of transporting an optical disk, and FIG. 11B is a plan view that shows the drive mechanism in a state where transport of the optical disk is completed;

FIG. 27A and FIG. 27B are views that show positions at which optical disks are ejected in the existing disk drive device, in which FIG. 27A shows a position at which a large-diameter disk is ejected, and FIG. 27B shows a position at which a small-diameter disk is ejected.

DESCRIPTION OF THE PREFERRED EMBODIMENTS

Figure 1:
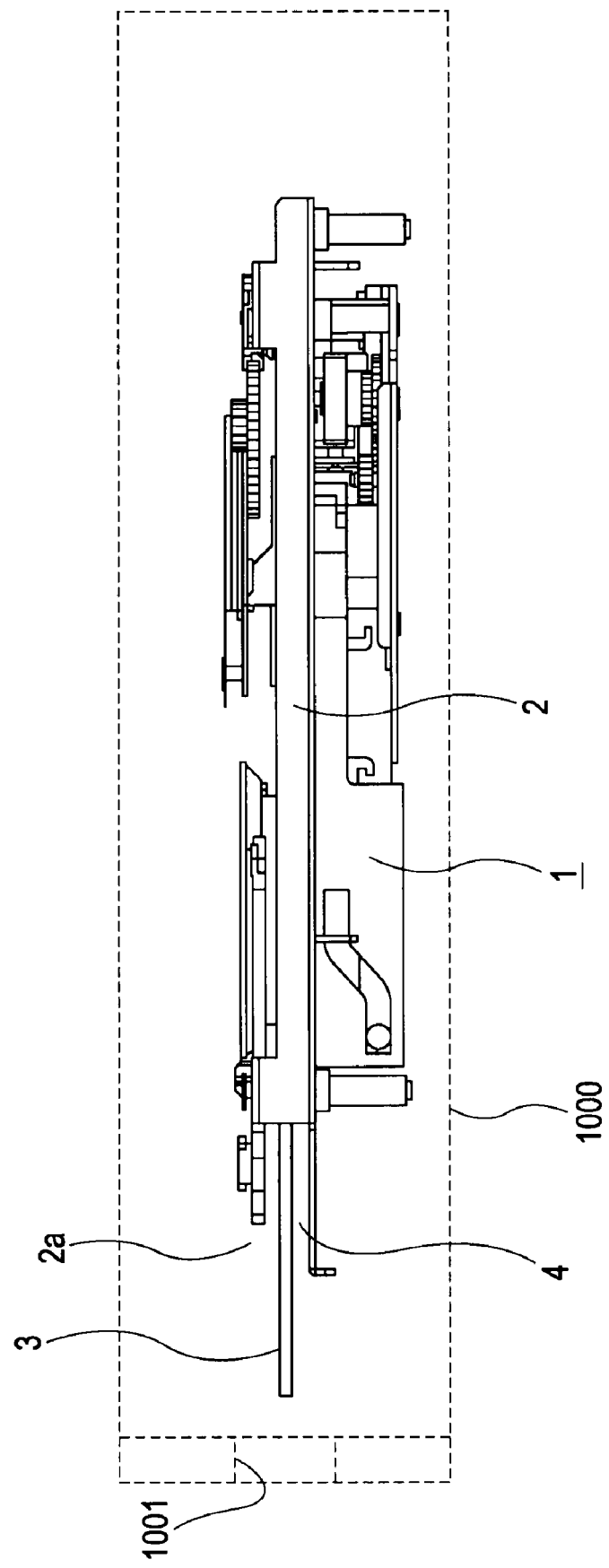
FIG. 1 is a side view that shows an electronic apparatus in which a disk drive device is assembled.

Hereinafter, a disk drive device and an electronic apparatus according to an embodiment of the invention will be described in detail with reference to the accompanying drawings. The disk drive device 1 is a recording and reproducing device for an optical disk 3, such as a CD (Compact Disk), a DVD (Digital Versatile Disk) and a BD (Blu-ray Disc), in which various types of data, such as music data and video data, are recorded. As shown in FIG. 1, the disk drive device 1 is installed inside various types of electronic apparatuses 1000, such as a disk recorder/reproducer connected to a television and uses an optical disk as a recording medium, an audio device, a game machine, a computer and an in-vehicle car audio/navigation system. The disk drive device 1 is, for example, compatible with a large-diameter disk 3A having a diameter of about 12 cm and a small-diameter disk 3B having a diameter of about 8 cm. The disk drive device 1 is a so-called slot-in type disk drive device that automatically loads the large or small optical disk 3 only by inserting the optical disk 3 from a disk insertion and ejection portion 4 provided at a front surface 2a of the device body 2.

Figure 2:
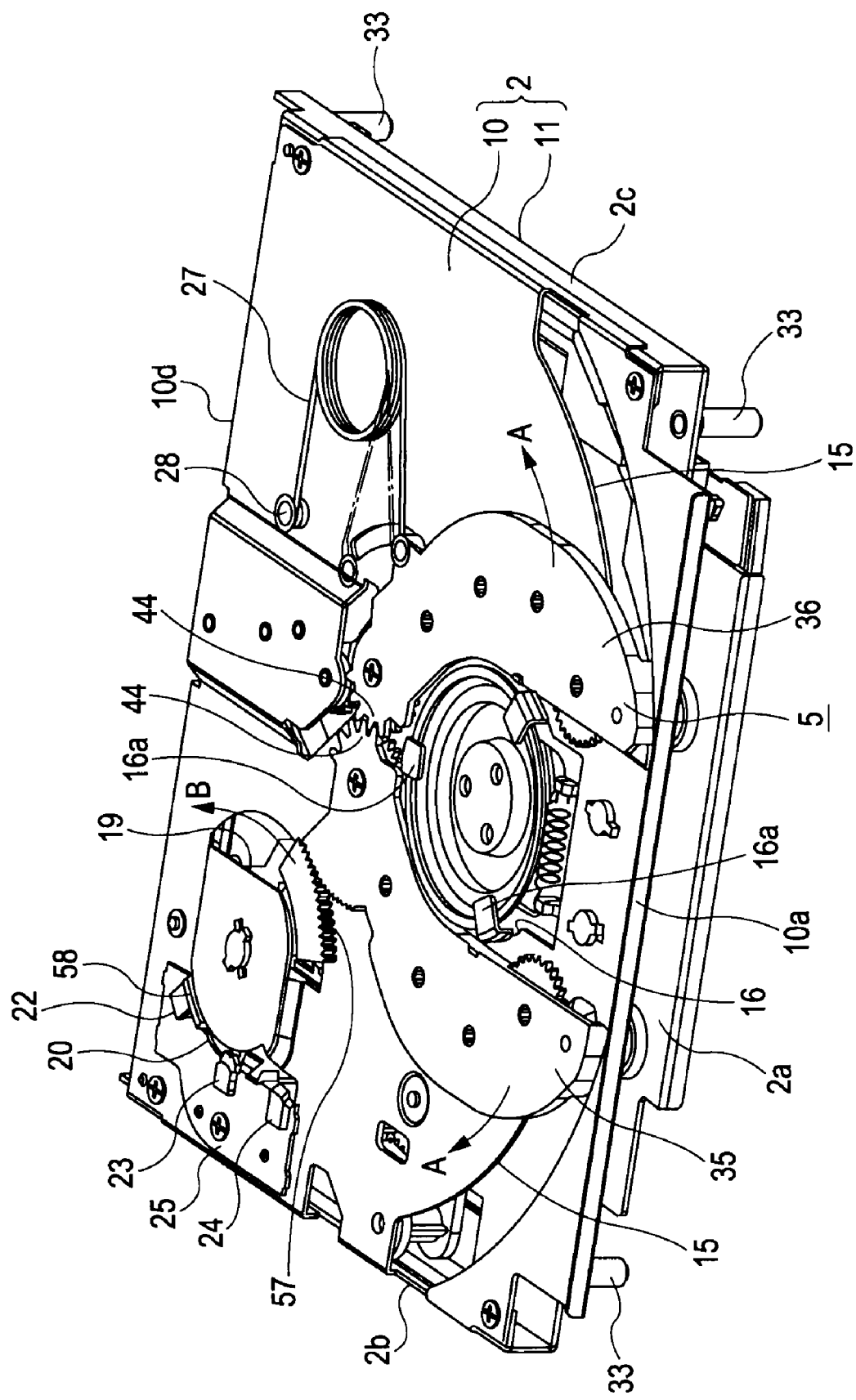
FIG. 2 is an external perspective view that shows the disk drive device to which an embodiment of the invention is applied.
Figure 3:
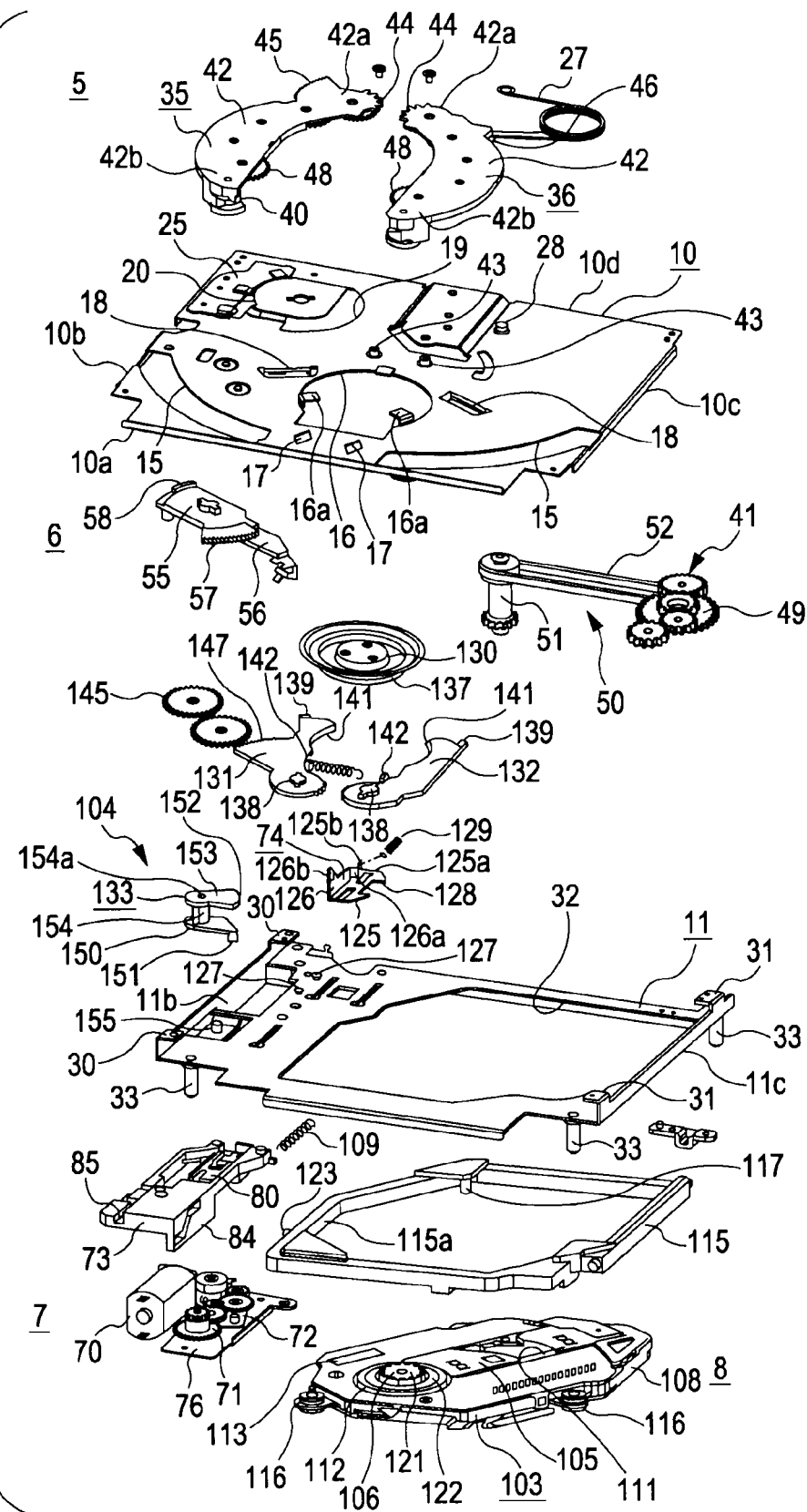
FIG. 3 is an exploded perspective view that shows the disk drive device to which the embodiment of the invention is applied.

As shown in FIG. 2 and FIG. 3, the device body 2 of the disk drive device 1 is formed to have a substantially rectangular shape by assembling a pair of upper and lower halves 10 and 11 together. In addition, a disk transport mechanism 5, a centering mechanism 6, a drive mechanism 7 and a disk recording and reproducing mechanism 8 are arranged in the device body 2. The disk transport mechanism 5 transports the optical disk 3 from the disk insertion and ejection portion 4, formed at the front surface 2a, to the inside or outside of the device body 2. The centering mechanism 6 centers the optical disk 3. The drive mechanism 7 supplies driving force to the disk transport mechanism 5 and the centering mechanism 6. The disk recording and reproducing mechanism 8 records and/or reproduces information signals to or from the optical disk 3.

Device Body

Figure 4:
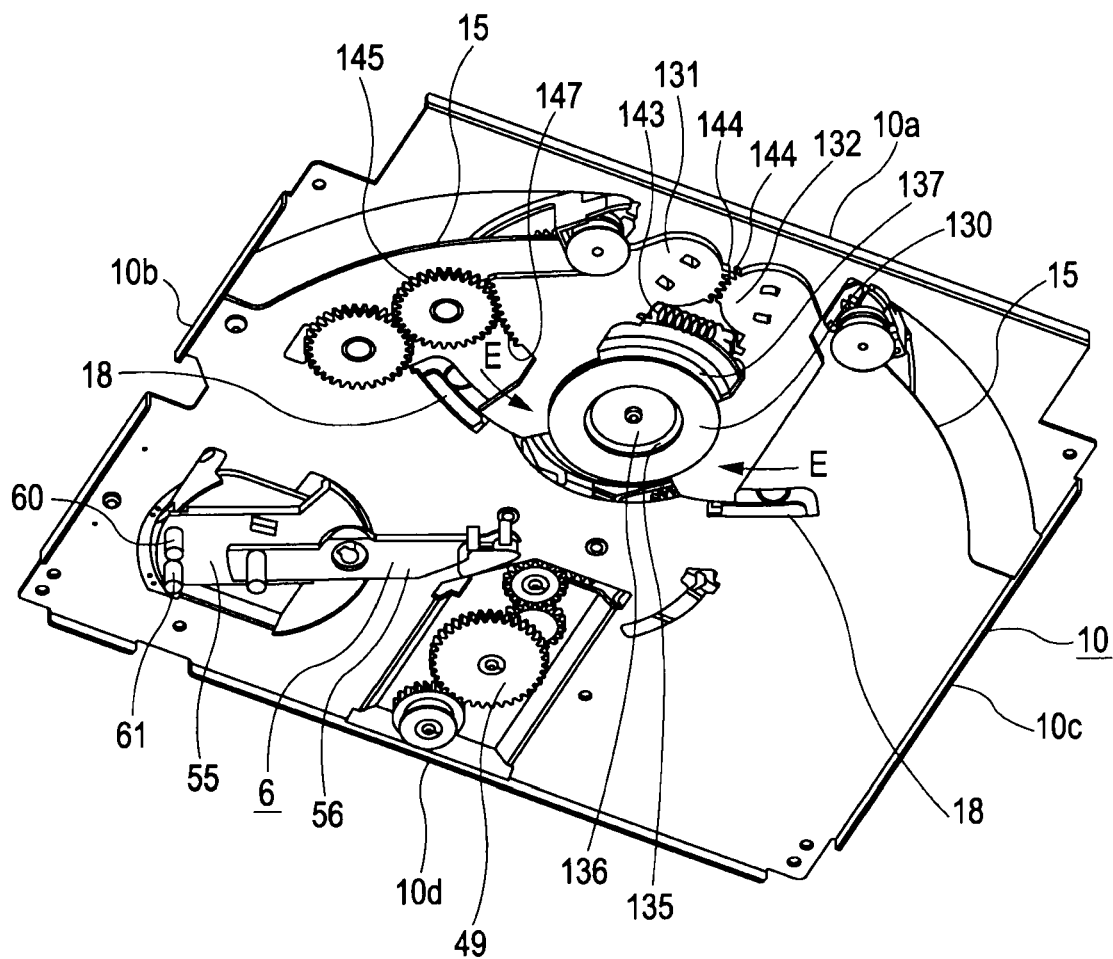
FIG. 4 is a perspective view that shows an upper half from an inner side.

As shown in FIG. 3 and FIG. 4, the upper half 10 that constitutes the device body 2 has circular arc arm guide holes 15 extending toward a downstream side in a direction in which the optical disk 3 is inserted over a range from a substantially middle of a front edge 10a that constitutes the front surface 2a to left and right edges 10b and 10c. Transport rollers 40 of a pair of transport arms 35 and 36, which will be described later, are inserted in the arm guide holes 15 inside the device body 2, and the transport rollers 40 move as the transport arms 35 and 36 pivot.

In addition, the upper half 10 has a plate support hole 16 at a position slightly deviated from the center toward the front edge 10a. The plate support hole 16 supports a chucking plate 130 that rotatably holds the optical disk 3 together with a turn table 106. A plurality of support pieces 16a project from the inner peripheral surface of the plate support hole 16 at predetermined intervals. The support pieces 16a support the chucking plate 130. In addition, arm support holes 17 and arm guide pieces 18 are formed near the plate support hole 16. The arm support holes 17 rotatably support first and second chucking arms 131 and 132 that move the chucking plate 130 toward or away from the turn table 106. The arm guide pieces 18 guide the first and second chucking arms 131 and 132 for pivoting. Note that a chucking unit 104 that rotatably chucks the optical disk 3 will be described later.

In addition, the upper half 10 has first and second lever opening portions 19 and 20 at the left edge 10b side adjacent to a rear edge 10d. The centering mechanism 6, which will be described later, is supported at the first and second lever opening portions 19 and 20. The first and second lever opening portions 19 and 20 allow a centering lever 55 to be extended to an upper surface side. A gear portion 57 of the centering lever 55 is passed through the first lever opening portion 19, and is engaged with the left transport arm 35. In addition, a switch pressing piece 58 of the centering lever 55 is passed through the second lever opening portion 20.

Figure 5A:
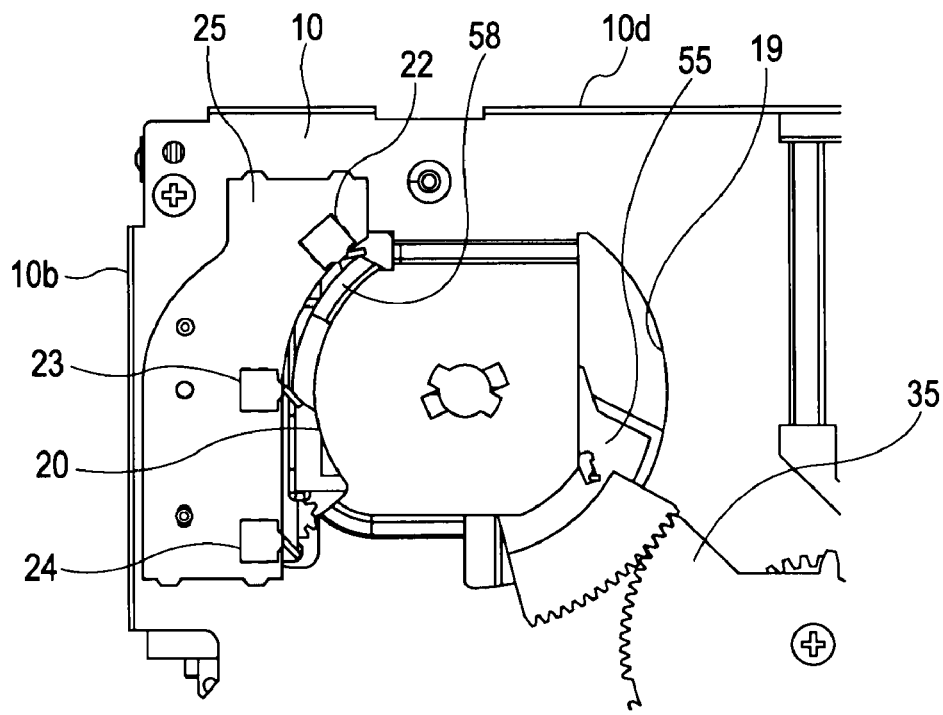
Figure 5B:
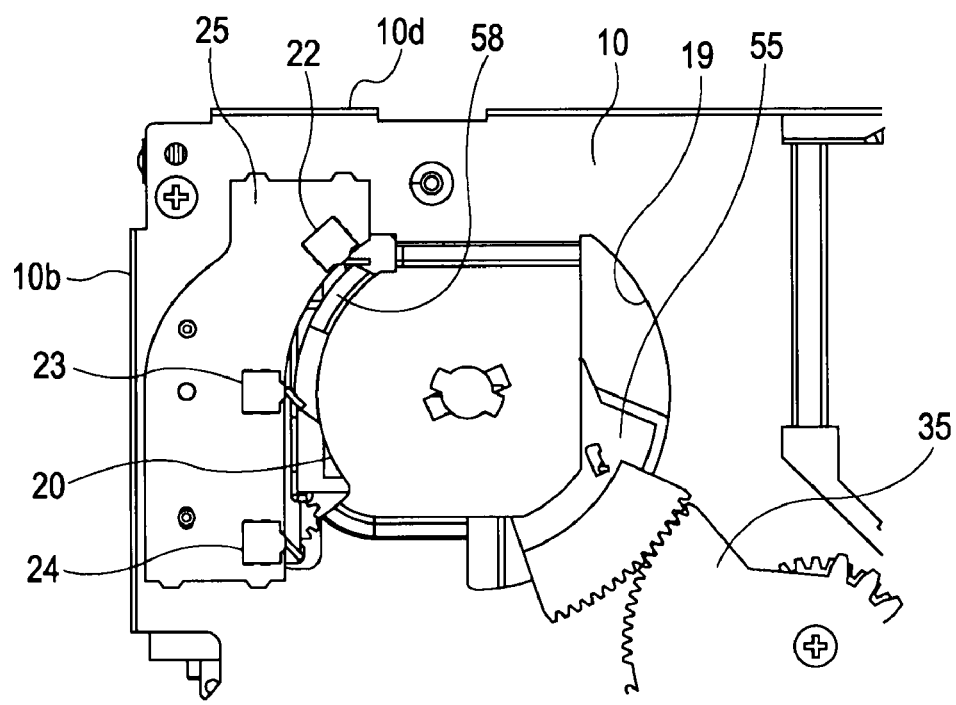
Figure 6A:
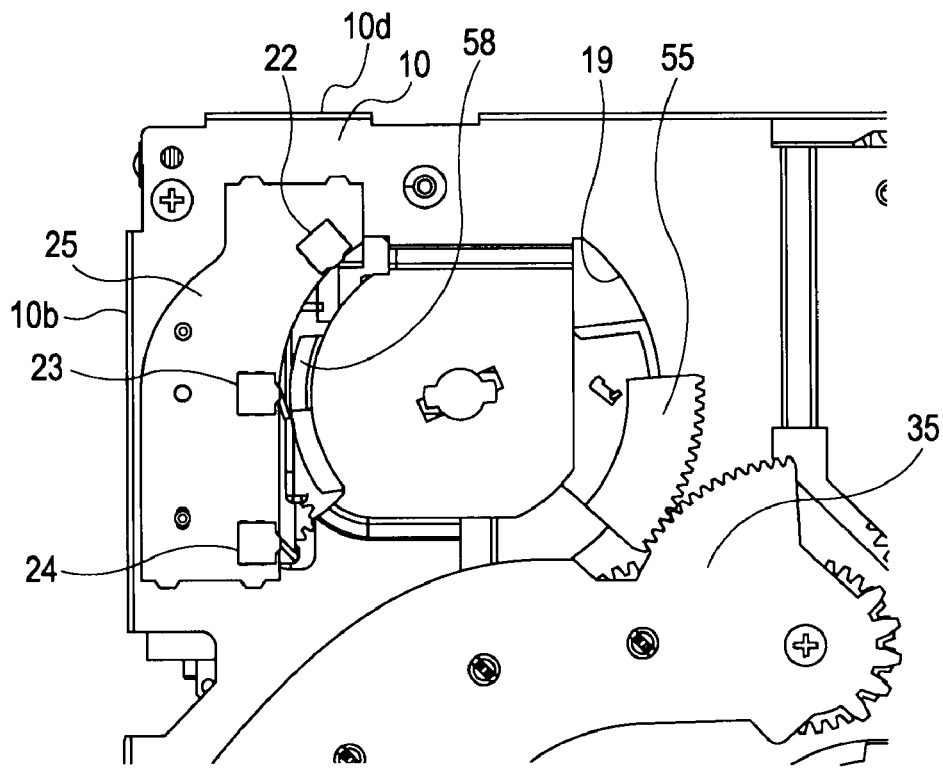
Figure 6B:
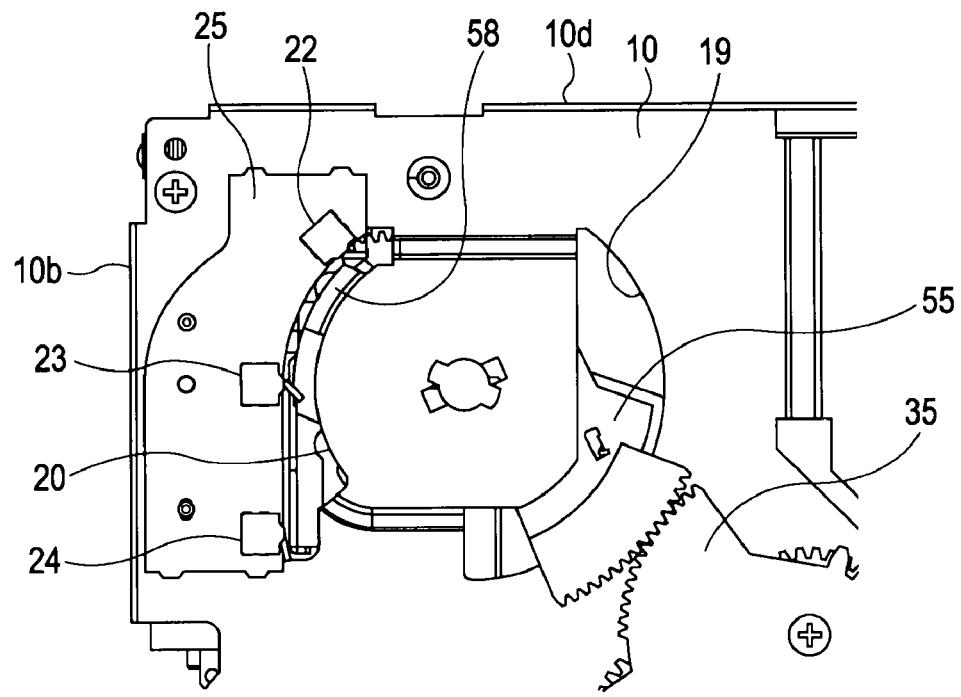

A switch substrate 25 is mounted near the second lever opening portion 20. First to third switches 22 to 24 are mounted on the switch substrate 25. The first and second switches 22 and 23 are arranged in a region in which the switch pressing piece 58 pivots, and detect insertion and ejection of the large-diameter optical disk 3A or the small-diameter optical disk 3B and which optical disk 3 is inserted. As shown in FIG. 5A and FIG. 5B, the first switch 22 is depressed by the centering lever 55 that moves in synchronization with the left transport arm 35 as the left transport arm 35 is maximally pivoted toward the front edge 10a of the upper half 10. As the optical disk 3 is inserted, depression of the first switch 22 is released (FIG. 5B). As the optical disk 3 is ejected, the first switch 22 is depressed (FIG. 5A). The second switch 23 is depressed by the centering lever 55 that moves in synchronization with the left transport arm 35 when the left transport arm 35 is pivoted toward the left edge 10b as the large-diameter disk 3A is inserted (FIG. 6A). The second switch 23 is placed at a position at which the second switch 23 is not depressed when the small-diameter disk 3B is inserted (FIG. 6B).

Figure 7:
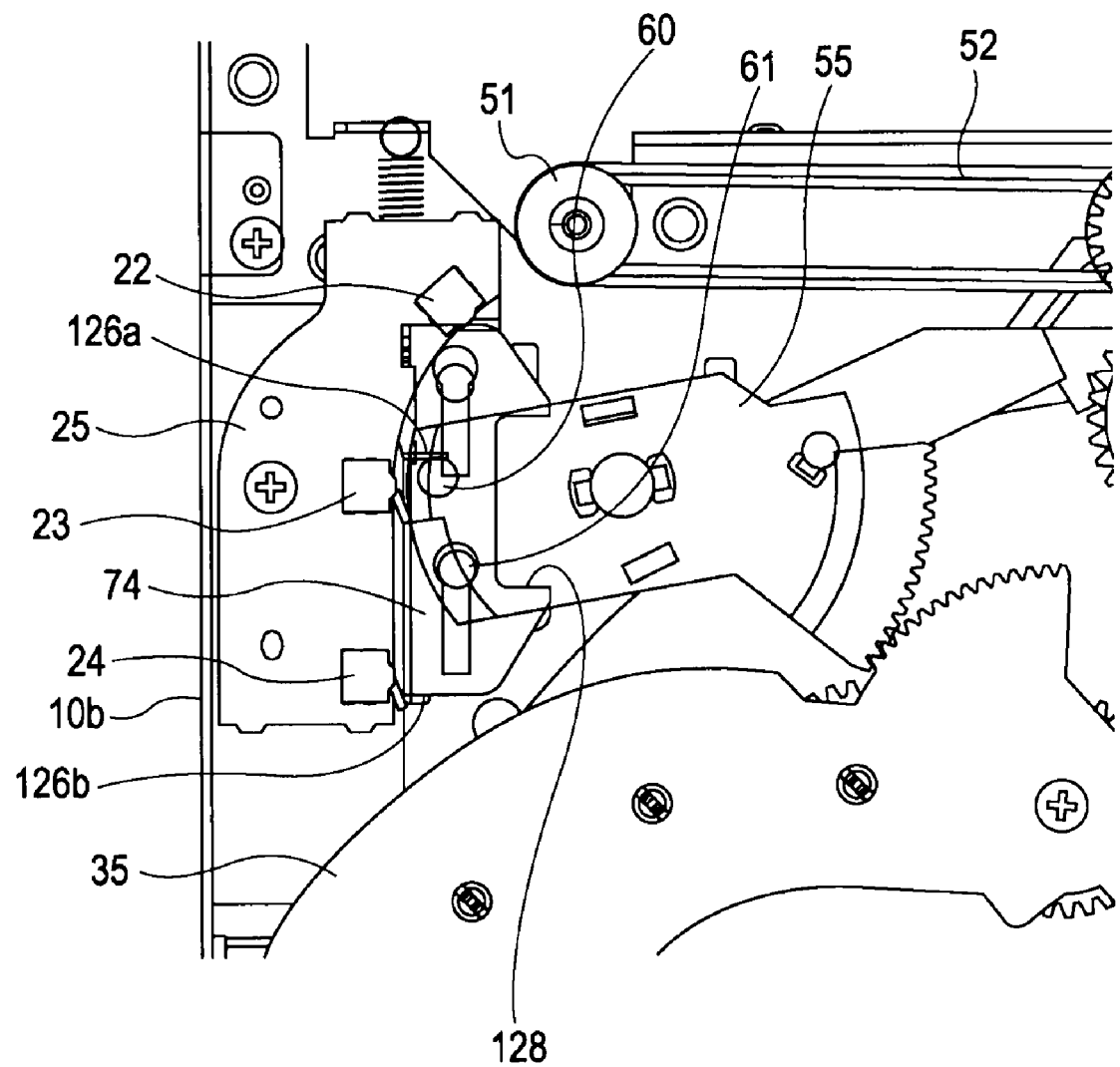
FIG. 7 is a plan view for illustrating a state where a third switch is depressed.

In addition, the third switch 24 detects that the optical disk 3 is placed in a recordable and reproducible state. The third switch 24 is provided in a sliding region of a release plate 74 that releases the pair of transport arms 35 and 36 and the centering arm 56 from the optical disk 3 chucked on the turn table 106. Then, the third switch 24 is pressed when the release plate 74 moves the arms away from the outer periphery of the optical disk 3, and, by so doing, detects that the optical disk 3 is made rotatable (FIG. 7).

Other than that, the upper half 10 supports a drive gear train 49 at a substantially middle at the rear edge 10d side. The drive gear train 49 drives the transport rollers 40 supported by the pair of transport arms 35 and 36. In addition, the upper half 10 has an engaging pin 28 by which one end of an urging spring 27 is anchored. The urging spring 27 pivotally urges the pair of transport arms 35 and 36 so as to bring the distal ends of the transport arms 35 and 36 close to each other.

The lower half 11 is formed in a substantially rectangular shape. The upper half 10 is connected to left and right walls 30 and 31 formed to extend from both left and right edges 11b and 11c of the lower half 11 to form the device body 2 that has a space for loading the optical disk 3. The lower half 11 has a traverse opening portion 32 over a range from a substantially center to the right edge 11c. A traverse unit 103 of the disk recording and reproducing mechanism 8 is arranged in the traverse opening portion 32. The disk recording and reproducing mechanism 8 records and/or reproduces information signals to or from the optical disk 3. In addition, the drive mechanism 7 is arranged at the left edge 11b side of the lower half 11. The drive mechanism 7 drives the disk transport mechanism 5, the disk recording and reproducing mechanism 8, and the like.

In addition, support pins 33 are disposed upright near respective corners of the lower half 11, and support the device body 2 inside an electronic apparatus body. The support pins 33 of the device body 2 are attached inside a casing of the electronic apparatus 1000 via dampers, so the disk insertion and ejection portion 4 is located adjacent to a disk insertion and ejection opening 1001 of the casing of the electronic apparatus. Then, the device body 2 inserts or ejects the optical disk 3, inserted in the disk insertion and ejection portion 4, by the disk transport mechanism 5. At this time, when the device body 2 transports the optical disk 3, whichever the large-diameter disk 3A or the small-diameter disk 3B, the device body 2 transports the optical disk 3 to an optimal position at which the center hole of the optical disk 3 is placed outside the disk insertion and ejection opening 1001 of the electronic apparatus 1000 and then holds the optical disk 3. Thus, a user is able to hold the optical disk 3 by grasping the center hole and the outer peripheral portion of the optical disk 3, so it is possible to handle the optical disk 3 without touching a signal recording surface.

Disk Transport Mechanism 5

Next, the disk transport mechanism 5 will be described. As shown in FIG. 3, the disk transport mechanism 5 includes the pair of left and right transport arms 35 and 36, the urging spring 27, the transport rollers 40 and a roller rotation mechanism 41. The transport arms 35 and 36 are rotatably supported on the upper surface of the upper half 10. The urging spring 27 brings the left transport arm 35 and the right transport arm 36 close to each other. The transport rollers 40 are formed at the distal ends of the transport arms 35 and 36, and transport the optical disk 3. The roller rotation mechanism 41 rotates the transport rollers 40.

The transport arms 35 and 36 each have a substantially rectangular plate-like arm body 42. The transport roller 40 and a roller gear train 48 are arranged on each arm body 42. The transport rollers 40 support the outer periphery of the optical disk 3. Each roller gear train 48 transmits driving force from the drive mechanism 7 to the corresponding transport roller 40. A proximal end portion 42a of each arm body 42 is inserted through a boss 43 that extends from the upper surface of the upper half 10. Thus, the arm bodies 42 are pivotable over the upper half 10 in arrow A directions or directions opposite to the arrow A directions in FIG. 2. In addition, each transport roller 40 is rotatably supported at a distal end portion 42b of the arm body 42, and the roller gear train 48 of the roller rotation mechanism 41 is rotatably supported over a range from the proximal end portion 42a to the distal end portion 42b.

A gear portion 44 of each of the pair of transport arms 35 and 36 is formed at the proximal end portion 42a of the arm body 42, and the gear portions 44 are engaged with each other on the rear edge side of the plate support hole 16. Thus, the transport arms 35 and 36 are pivoted while being synchronized with each other by the gear portions 44 in an insertion/ejection process of the optical disk 3. That is, in the insertion process of the optical disk 3, the arm bodies 42 of the transport arms 35 and 36 are pivoted toward the downstream side in the disk insertion direction equally at left and right sides while being opened from the front edge 2a of the device body 2 toward both left and right edges 2b and 2c in the arrow A directions in FIG. 2. In addition, in the ejection process of the optical disk 3, the arm bodies 42 of the transport arms 35 and 36 are pivoted equally at left and right sides from both left and right edges 2b and 2c of the device body 2 toward the front edge 2a in the directions opposite to the arrow A directions in FIG. 2. Thus, the transport arms 35 and 36 have the transport rollers 40 that roll on the outer periphery of the optical disk 3 supported equally at left and right equal positions of the outer periphery of the optical disk 3, and are able to advance the optical disk 3 in the front and rear directions of the device body 2.

Note that each arm body 42 is formed in an arcuate shape that avoids the plate support hole 16 formed at a substantially center of the upper surface of the upper half 10 in a state where the arm bodies 42 are pivoted by the urging spring 27 to bring the distal end portions 42b close to each other. Thus, the proximal end portions 42a of the arm bodies 42 may be pivotally supported and engaged with each other on the rear edge 10d side of the plate support hole 16, and the distal end portions 42b of the arm bodies 42 may be extended toward the front edge 10a.

Figure 8:
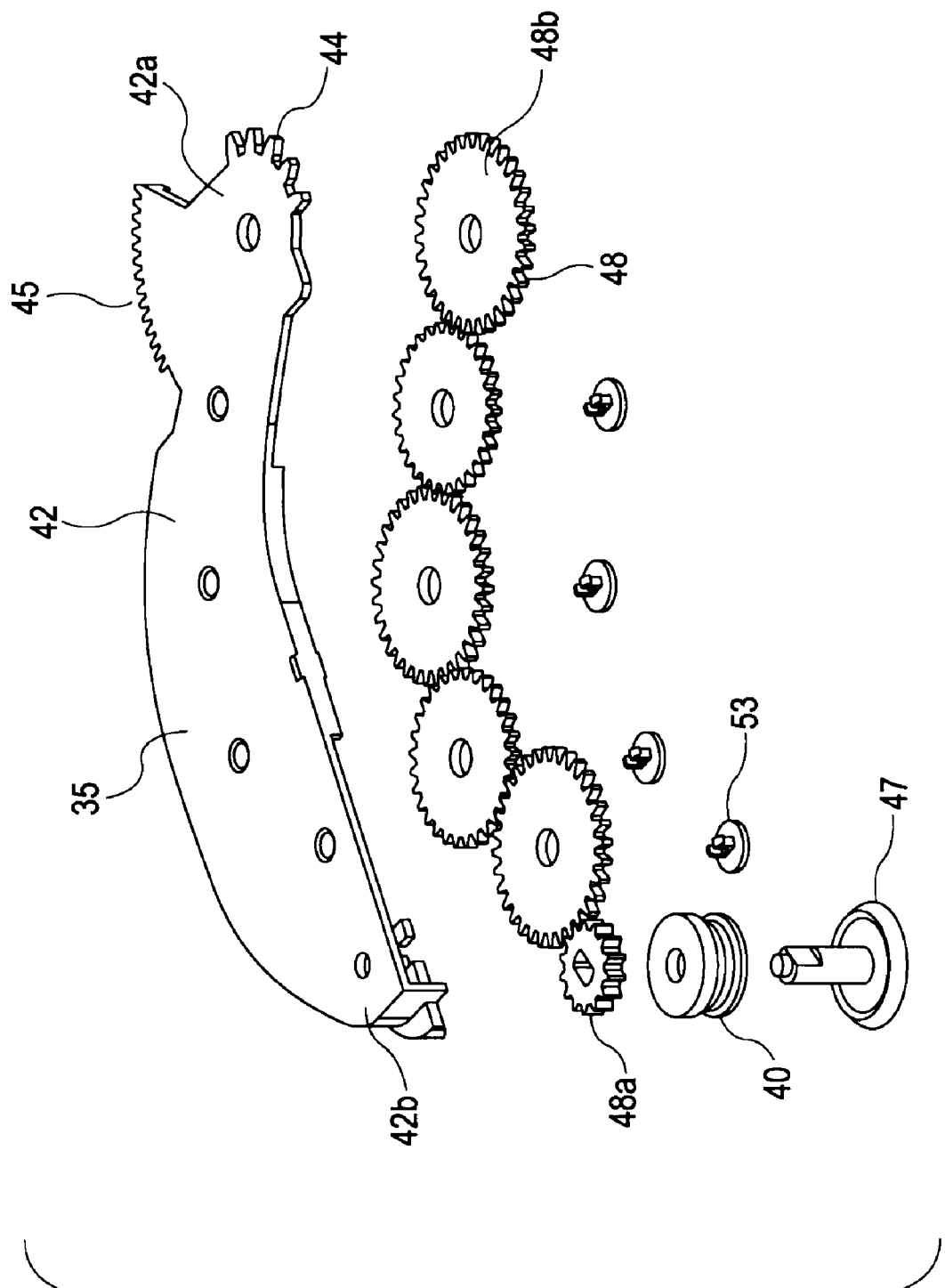
FIG. 8 is an exploded perspective view that shows a left transport arm.

As shown in FIG. 8, in the left transport arm 35 supported at the left edge 10b side of the upper half 10, a coupling gear portion 45 is formed at the proximal end portion 42a of the arm body 42 and is coupled to the centering lever 55. The left transport arm 35 is gear-coupled to the centering lever 55, so, as the proximal end portion 42a is pivoted about the fulcrum in the arrow A direction to draw the optical disk 3, the left transport arm 35 is able to synchronously pivot the centering lever 55. In addition, the left transport arm 35, together with the right transport arm 36, is pivoted in the arrow A direction in synchronization with the pivot of the centering lever 55 in an arrow B direction.

The right transport arm 36 supported at the right edge 10c side of the upper half 10 has a spring anchoring portion 46 at the proximal end portion 42a of the arm body 42. The other end of the urging spring 27 is anchored by the spring anchoring portion 46. The right transport arm 36 is pivotally urged in the direction opposite to the arrow A direction in FIG. 2 by the urging spring 27 about the boss 43 as a spindle. Then, the left and right transport arms 35 and 36 are gear-coupled to each other via the gear portions 44. Thus, as the right transport arm 36 is urged by the urging spring 27, the distal end portions 42b of the arm bodies 42 pivot toward the front surface 2a of the device body 2 and are urged in the directions opposite to the arrow A directions to approach each other.

The transport roller 40 supported at the distal end portion 42b of each arm body 42 has a substantially drum shape and is made of a material having a large friction coefficient, such as rubber. As shown in FIG. 8, a pivot support member 47 is inserted into each transport roller 40 to support the transport roller 40 coaxially with one gear 48a that constitutes the roller gear train 48. The transport roller 40 is rotated as the roller gear train 48 rotates. The transport rollers 40 are inserted through the arm guide holes 15, formed in the upper half 10, into the device body 2. The transport rollers 40 roll on the outer peripheral surface of the optical disk 3 inserted in the device body 2 to transport the optical disk 3 to the inside or outside of the device body 2.

As shown in FIG. 3 and FIG. 4, the roller rotation mechanism 41 that rotates the transport rollers 40 includes the roller gear trains 48, the drive gear train 49 and a pulley 50. The roller gear trains 48 are supported by the arm bodies 42 together with the transport rollers 40. The drive gear train 49 is coupled to the roller gear trains 48 and is supported by the upper half 10. The pulley 50 transmits driving force of the drive mechanism 7 to the drive gear train 49.

In each of the roller gear trains 48, a plurality of gears are rotatably supported by the arm body 42 by pivot support members 53 over a range from the proximal end portion 42a of the arm body 42 to the distal end portion 42b thereof. In each of the roller gear trains 48, one gear 48b supported at a position closest to the proximal end portion 42a side of the arm body 42 is engaged with one gear that constitutes the drive gear train 49 supported by the upper half 10. By so doing, as the drive gear train 49 is rotated, the roller gear trains 48 provided for the transport arms 35 and 36 rotate the transport rollers 40 of the left and right transport arms 35 and 36 in opposite directions.

The drive gear train 49 is supported in a range from a substantially center of the upper half 10 toward the rear edge 10d. One end of the drive gear train 49 is engaged with the roller gear trains 48, and the other end is engaged with the pulley 50. The pulley 50 includes a pulley gear 51 and a pulley belt 52. The pulley gear 51 is coupled to a drive motor 70 of the drive mechanism 7. The pulley belt 52 is wound between the pulley gear 51 and a gear provided at the other end of the drive gear train 49.

In the above disk transport mechanism 5, as the drive motor 70 is driven in forward direction or reverse direction, the drive gear train 49 is rotated through the pulley 50 of the roller rotation mechanism 41. By so doing, the roller gear trains 48 of the left and right transport arms 35 and 36 are rotated in opposite directions to rotate the transport rollers 40 in opposite directions by the same amount of rotation. Thus, the transport arms 35 and 36 support the outer periphery of the optical disk 3 by the transport rollers 40 from both left and right sides. By so doing, the transport arms 35 and 36 are able to stably transport the optical disk 3 in the disk insertion direction or in the disk ejection direction in accordance with the direction in which the drive motor 70 rotates.

The disk transport mechanism 5 constantly brings the transport rollers 40 into close contact with the outer peripheral surface of the optical disk 3 because the left and right transport arms 35 and 36 are pivotally urged by the urging spring 27 in the directions opposite to the arrow A directions in which the left and right transport arms 35 and 36 approach each other. Then, in the disk transport mechanism 5, as the transport rollers 40 roll on the outer peripheral surface of the optical disk 3, the left and right transport arms 35 and 36 are pivoted about the bosses 43 as fulcrums in the arrow A directions or in the directions opposite to the arrow A directions.

Note that the disk transport mechanism 5 may provide the roller gear train 48 of the roller rotation mechanism 41 only for any one of the left and right transport arms 35 and 36. In this case as well, in the disk transport mechanism 5, the transport rollers 40 of the left and right transport arms 35 and 36 hold the outer peripheral surface of the optical disk 3, and the transport roller 40 provided for one of the transport arms rolls on the outer periphery of the optical disk 3, thus making it possible to transport the optical disk 3 to the inside or outside of the device body 2.

In this way, in the disk drive device 1, the left and right transport arms 35 and 36 are supported at the rear edge 2d side of the device body 2, and the transport rollers 40 that support the outer peripheral surface of the optical disk 3 are pivoted toward the front surface 2a. Therefore, it is possible to reliably eject the large-diameter disk 3A and the small-diameter disk 3B to the position at which the center hole 3a is placed outside.

In addition, in the disk drive device 1, the left and right transport arms 35 and 36 are supported at the substantially center of the device body 2, and the transport rollers 40 that support the outer peripheral surface of the optical disk 3 are pivoted over a range from the left and right edges 2b and 2c of the device body 2 toward the middle of the front surface 2a. This reduces the region in which the transport rollers 40 pivot at the front surface 2a side of the device body 2. Thus, it is possible to ensure a space. That is, in the disk drive device 1, the region in which the transport rollers 40 pivot at the front surface 2a side of the device body 2 is made minimal. Thus, both sides of the front surface 2a may be freely designed. This may, for example, allow arrangement of another component or may increase the degree of freedom of design of an electronic apparatus to which the disk drive device 1 is assembled.

In addition, in the disk drive device 1, the proximal end portion 42a of the left transport arm 35 is pivotally supported at the rear edge 10d side of the device body 2, and the gear portion 57 of the centering lever 55 is engaged with the coupling gear portion 45 provided at the proximal end portion 42a. Thus, in the disk drive device 1, the left transport arm 35 is coupled to the centering lever 55 without intervening an intermediate gear, or the like. Therefore, without increasing the number of components and increasing the size and weight of the device body and without causing rattling due to accumulation of manufacturing tolerance, assembling tolerance, or the like, of a mediating member, it is possible to pivot the centering lever 55 in synchronization with the pivot of the left transport arm 35.

Centering Mechanism 6

Figure 9A:
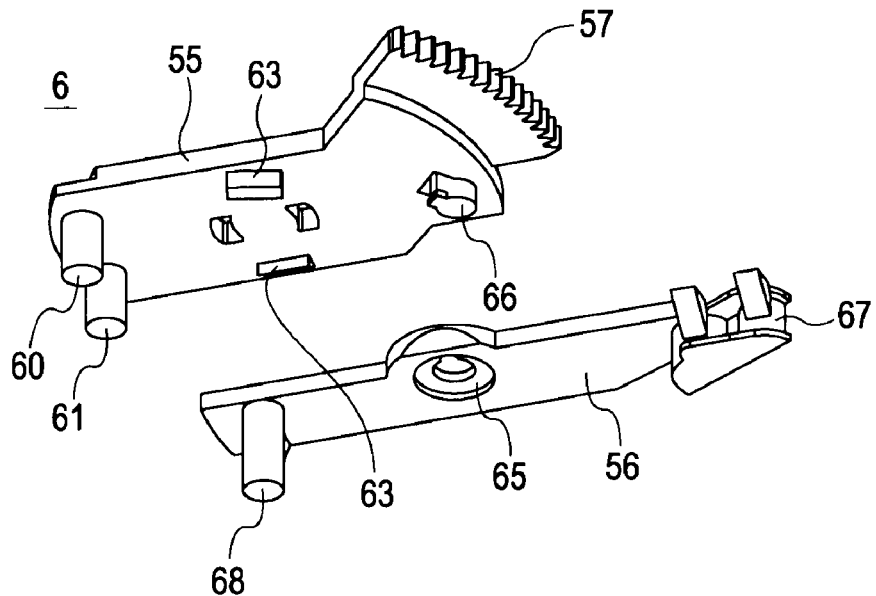
FIG. 9A is a perspective view of a centering mechanism.
Figure 9B:
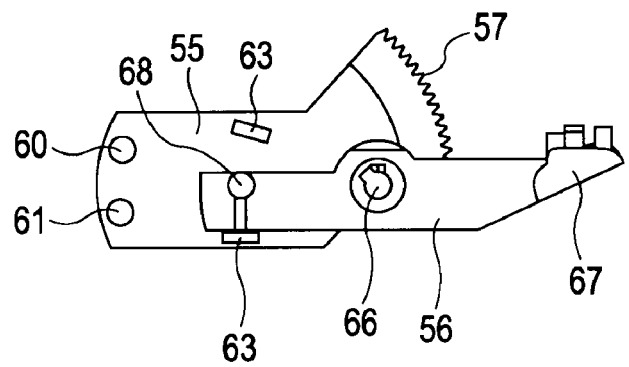
FIG. 9B is a bottom view of the centering mechanism.
Figure 9C:
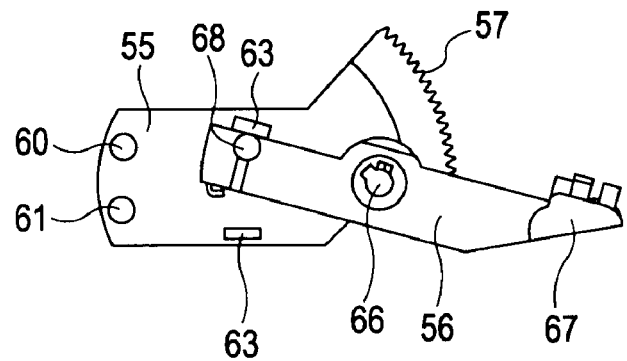
FIG. 9C is a bottom view of the centering mechanism.

Next, the centering mechanism 6 that centers the optical disk 3 will be described. The centering mechanism 6 guides the optical disk 3 to a centering position at which the center hole 3a of the optical disk 3 is positioned at a substantially directly above the turn table 106. As shown in FIG. 9A to FIG. 9C, the centering mechanism 6 includes the centering lever 55 and the centering arm 56. The centering lever 55 is coupled to the left transport arm 35. The centering arm 56 supports the optical disk 3. Then, in the centering mechanism 6, the centering arm 56 is pivotably coupled to the centering lever 55.

The centering lever 55 is rotatably supported on the inner surface of the upper half 10. The centering lever 55 has a gear portion 57 and a switch pressing piece 58. The gear portion 57 is inserted through the first lever opening portion 19 formed in the upper half 10, and is extended to the upper surface side of the upper half 10. The switch pressing piece 58 is placed in the second lever opening portion 20 formed in the upper half 10, and presses the first and second switches 22 and 23. Then, the gear portion 57 of the centering lever 55 is engaged with the coupling gear portion 45 of the left transport arm 35, so the centering lever 55 is pivoted in the arrow B direction or in the direction opposite to the arrow B direction in FIG. 2 in synchronization with the pivot of the left transport arm 35. In addition, in synchronization with the pivot of the left transport arm 35, the switch pressing piece 58 of the centering lever 55 is able to pivot in the region in which the first and second switches 22 and 23 are placed in the second lever opening portion 20 are arranged to depress the switches 22 and 23.

In addition, because the left and right transport arms 35 and 36 are constantly urged by the urging spring 27 to pivot in the directions opposite to the arrow A directions, the centering lever 55 is also urged to pivot in the direction opposite to the arrow B direction similarly. In the insertion waiting state for the optical disk 3 shown in FIG. 2, as shown in FIG. 5A, the switch pressing piece 58 of the centering lever 55 depresses the first switch 22. Then, as the optical disk 3 is inserted and then the left transport arm 35 is pivoted in the arrow A direction, the centering lever 55 is synchronously pivoted in the arrow B direction. Thus, as shown in FIG. 5B, depression of the first switch 22 by the switch pressing piece 58 is released. By so doing, the disk drive device 1 detects that the optical disk 3 is inserted into the device body 2.

In addition, as the large-diameter optical disk 3A is inserted in the device body 2, the centering lever 55 is pivoted in the arrow B direction by a larger amount in accordance with the amount by which the left transport arm 35 is pivoted. Thus, as shown in FIG. 6A, the switch pressing piece 58 depresses the second switch 23. By so doing, the disk drive device 1 is able to detect that the large-diameter optical disk 3A is inserted. On the other hand, when the small-diameter optical disk 3B is inserted, the pivot amount of the left transport arm 35 is small, so the pivot amount of the centering lever 55 in synchronization with the pivot of the left transport arm 35 is also small in the arrow B direction. Thus, as shown in FIG. 6B, the switch pressing piece 58 does not depress the second switch 23.

In addition, in the centering lever 55, first and second release pins 60 and 61 protrude toward the lower half 11. The first and second release pins 60 and 61 move the centering arm 56 away from the outer peripheral surface of the optical disk 3 when the optical disk 3 is recorded or reproduced. The first and second release pins 60 and 61 are pressed by the release plate 74, which will be described later, to pivot the centering lever 55 in the arrow B direction. The first release pin 60 is pivoted to a locus of movement of a cam piece 126a of the release plate 74 and is pressed by the cam piece 126a when the large-diameter disk 3A is inserted. The second release pin 61 is pivoted to a locus of movement of the cam piece 126a of the release plate 74 and is pressed by the cam piece 126a when the small-diameter disk 3B is inserted. Note that FIG. 7 shows a state where the first release pin 60 is pivoted to the locus of movement of the cam piece 126a when the large-diameter disk 3A is inserted.

In addition, the centering lever 55 has restricting pieces 63 at the lower half 11 side. The restricting pieces 63 restricts a range in which the centering arm 56 pivots. The pair of restricting pieces 63 are provided so as to be spaced apart in the width direction of the centering lever 55, and the centering arm 56 is pivotably arranged in between. The restricting pieces 63 restrict pivot of the centering arm 56, which supports the outer peripheral surface of the optical disk 3, to center the optical disk 3. In addition, as the centering lever 55 is pivoted by the release plate 74, the restricting pieces 63 pivot the centering arm 56 to move away from the outer peripheral surface of the optical disk 3.

The centering arm 56 has a fitting hole 65 at a substantially middle portion in the longitudinal direction. The fitting hole 65 is engaged with a fitting piece 66 formed to extend from the centering lever 55 so as to be inserted in the fitting hole 65. Thus, the centering arm 56 is pivotable. By so doing, the centering arm 56 is pivotable between the restricting pieces 63. The centering arm 56 has a disk support portion 67 at one end in the longitudinal direction. The disk support portion 67 supports the outer peripheral surface of the optical disk 3. The centering arm 56 has a slider pressing pin 68 at the other end in the longitudinal direction. The slider pressing pin 68 slides a slider 73, which will be described later.

The centering arm 56 moves in the arrow B direction together with the centering lever 55 as the optical disk 3 is inserted. At this time, the disk support portion 67 moves toward a downstream side in the disk insertion direction in advance of the optical disk 3, so the centering arm 56 is not supporting the outer peripheral surface of the optical disk 3. As the transport rollers 40 roll beyond the maximum outer diameter of the optical disk 3, the left and right transport arms 35 and 36 that receive the urging force of the urging spring 27 are restricted from pivoting in the arrow A directions, and the centering lever 55 that is gear-coupled to the left transport arm 35 is also restricted from pivoting in the arrow B direction. On the other hand, the centering arm 56 is pivotably supported by the centering lever 55, so the disk support portion 67 is pressed against the outer peripheral surface of the optical disk 3 transported toward the downstream side in the insertion direction by the transport rollers 40, and is pivoted in that direction. Then, as the centering arm 56 pivots to the centering position of the optical disk 3, the centering arm 56 is restricted by the restricting piece 63 from pivoting, and holds the optical disk 3 at the centering position.

Figure 17:
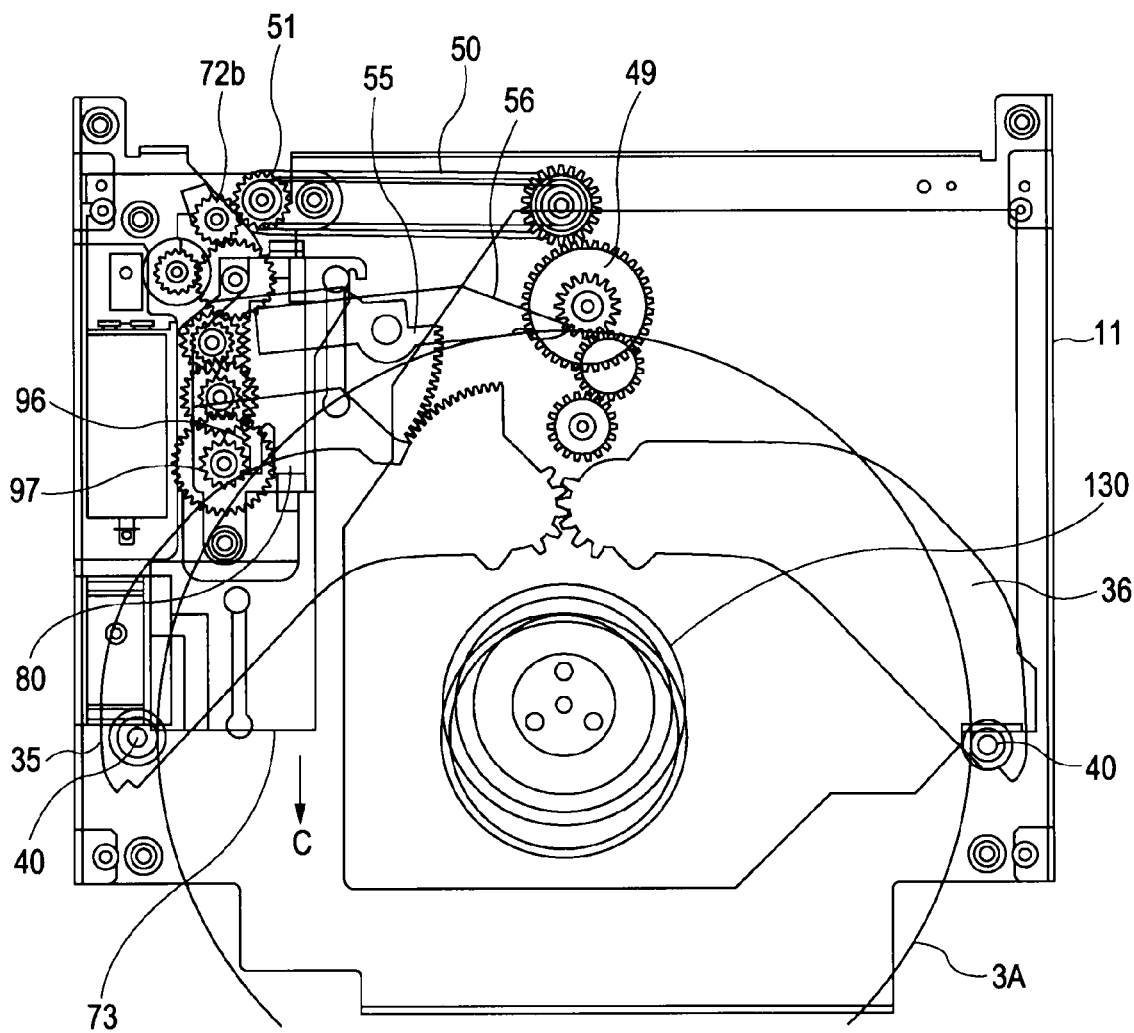
FIG. 17 is a plan view that shows the disk drive device in which the pivot of a centering arm is restricted.
Figure 18:
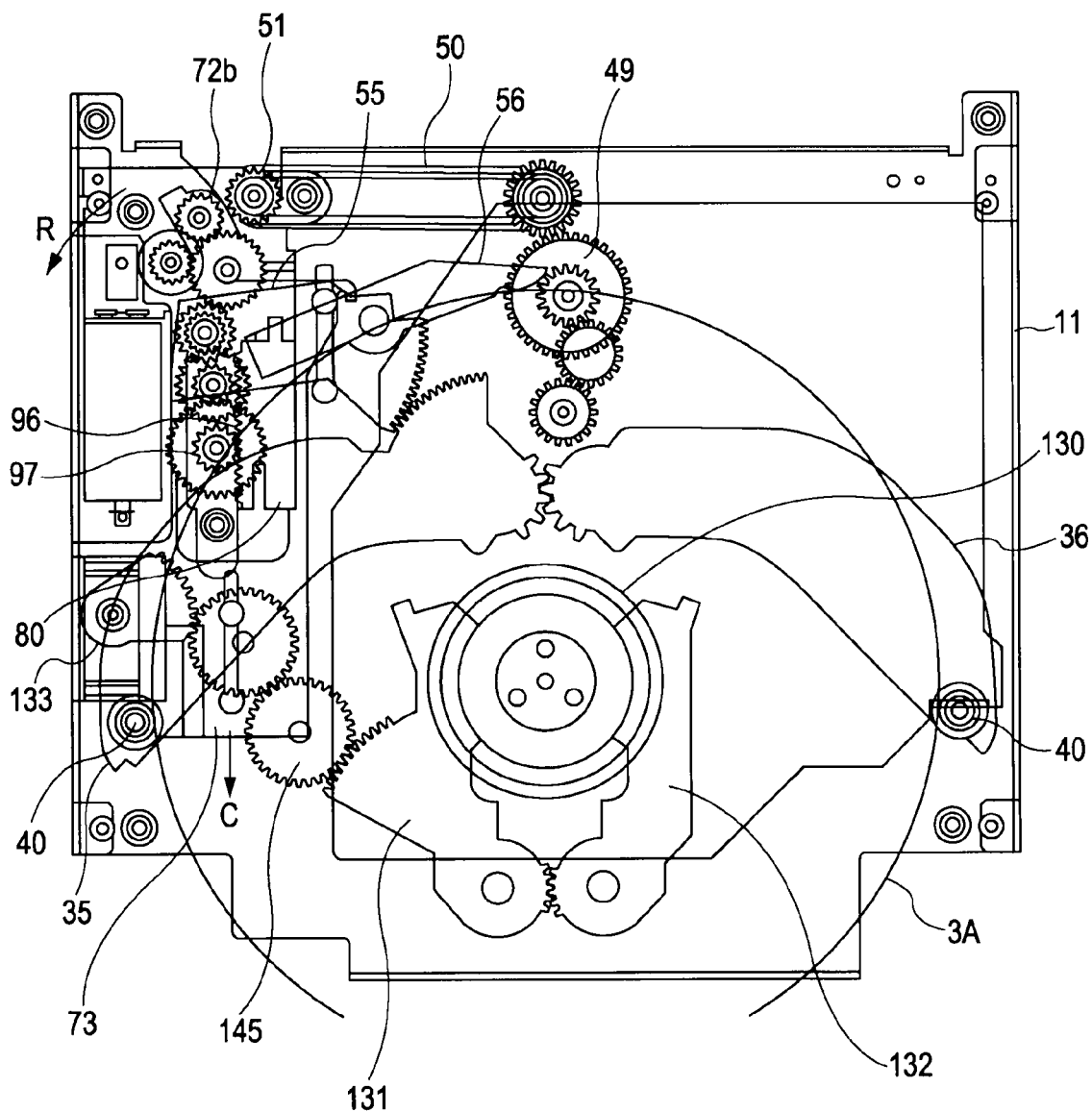
FIG. 18 is a plan view that shows the disk drive device that centers the large-diameter disk.

At the centering position of the optical disk 3, the slider pressing pin 68 of the centering arm 56 slides the slider 73, which is moved away from a drive gear 71 of the drive mechanism 7, in an arrow C direction in FIG. 17 and FIG. 18, to cause the slider 73 to engage with a slider drive gear 71c of the drive gear 71. Note that at this time, the centering arm 56 is pressed against the outer peripheral surface of the optical disk 3 by being urged in the arrow B direction, and pivot of the centering arm 56 is restricted so that the restricting piece 63 of the centering lever 55, which is restricted from pivoting in the arrow B direction by being gear-coupled to the left transport arm 35, contacts the centering arm 56. Thus, as the disk support portion 67 is pressed by the outer peripheral surface of the optical disk 3, the centering arm 56 is able to transmit the pressing force via the slider pressing pin 68 to the slider 73 to slide the slider 73 in the arrow C direction.

Here, the gear portion 57 of the centering lever 55 and the coupling gear portion 45 of the left transport arm 35 are configured to have a gear ratio such that, for example, even when any one of the large-diameter disk 3A having a diameter of 12 cm and the small-diameter disk 3B having a diameter of 8 cm is inserted, the left and right transport arms 35 and 36 and the centering arm 56 support the outer peripheral surface of the optical disk 3 and hold the optical disk 3 at the centering position.

Figure 24:
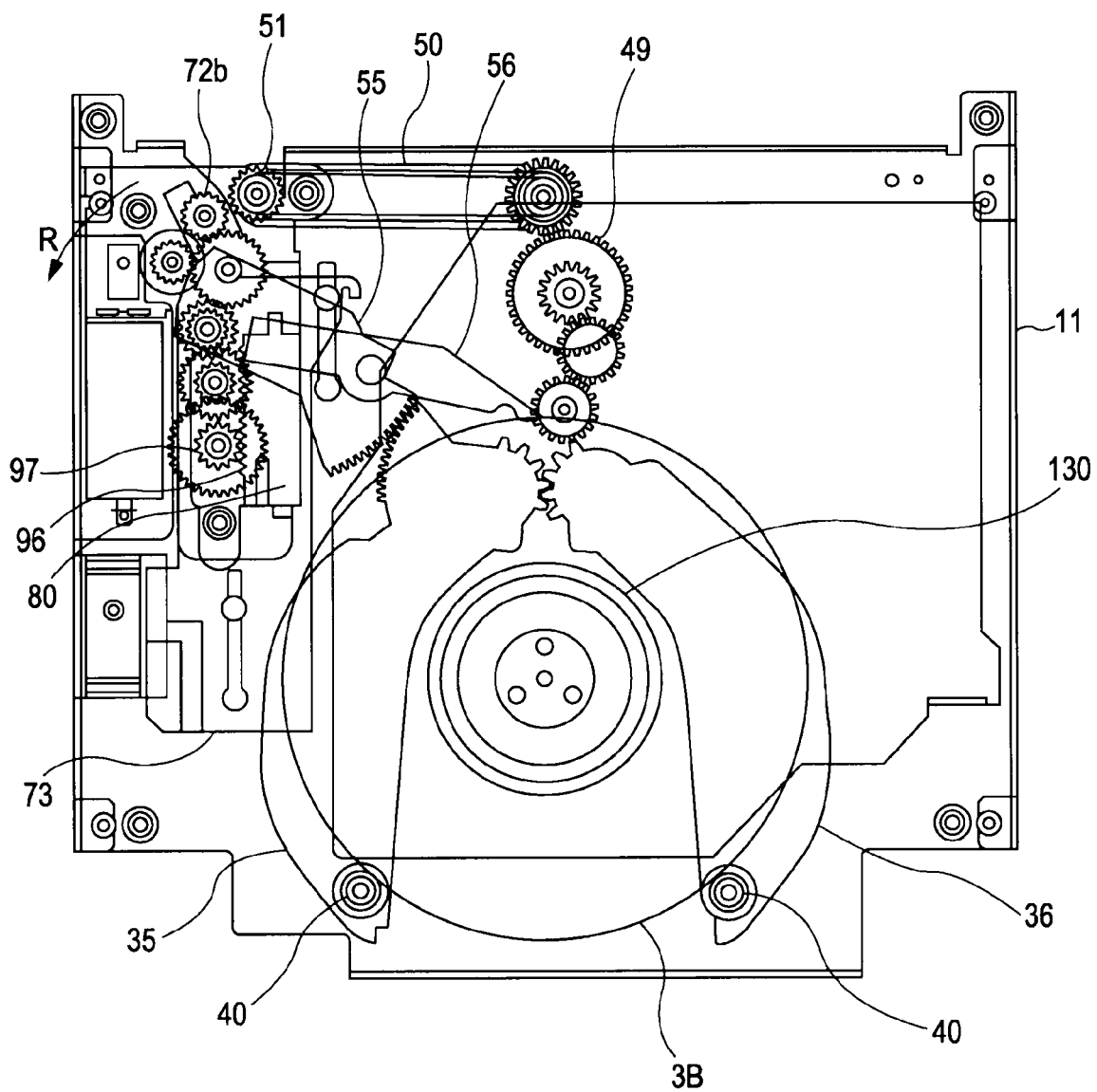
FIG. 24 is a plan view that shows the disk drive device that centers the small-diameter disk.

That is, as shown in FIG. 18 and FIG. 24, in the disk drive device 1, even when any one of the large-diameter disk 3A and the small-diameter disk 3B is inserted, the transport rollers 40 of the left and right transport arms 35 and 36 urge the optical disk 3 in the insertion direction at the centering position, the centering arm 56 is restricted by the restricting piece 63 from pivoting and is located opposite the transport rollers 40 to support the optical disk 3. Then, when any one of the large and small optical disks 3 is inserted as well, the centering lever 55 and the left transport arm 35 are coupled to each other at a gear ratio such that the outer peripheral surface of the optical disk 3 contacts the disk support portion 67 of the centering arm 56 near each centering position and the restricting piece 63 is able to restrict pivot of the centering lever 55 and the left transport arm 35.

The above gear ratio is appropriately designed on the basis of the diameter of the optical disk 3, the centering position, the dimensions of components of the disk transport mechanism 5 and centering mechanism 6, and the like.

Drive Mechanism 7

Figure 10:
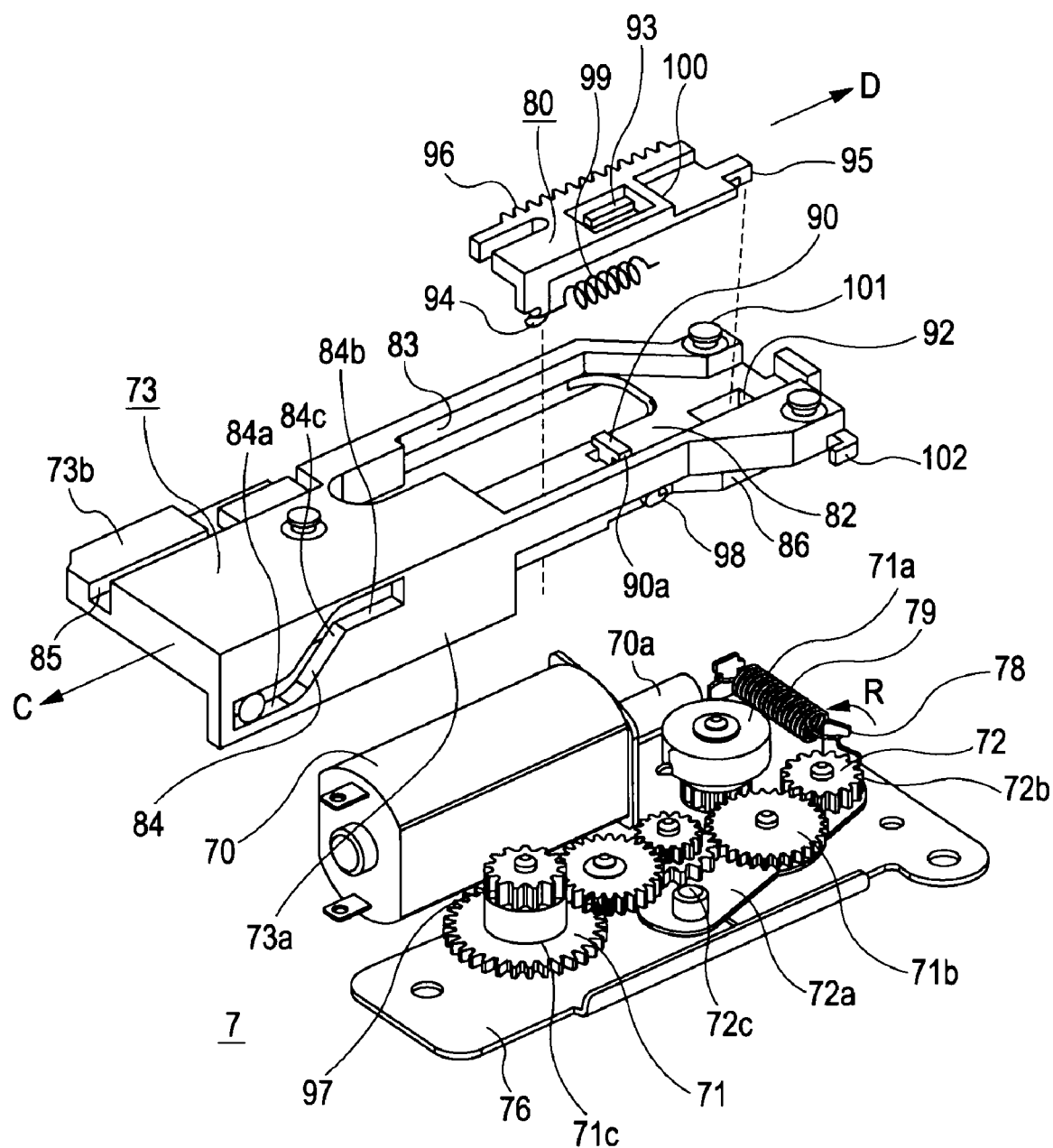
FIG. 10 is an exploded perspective view that shows a drive mechanism.

Next, the drive mechanism 7 that supplies driving force to these disk transport mechanism 5 and centering mechanism 6 will be described. As shown in FIG. 3, FIG. 10 and FIG. 11, the drive mechanism 7 includes the drive motor 70, the drive gear 71, a pivot gear 72, the slider 73, and the release plate 74. The drive gear 71 is engaged with a worm 70a of the drive motor 70. The pivot gear 72 transmits driving force to the roller rotation mechanism 41. The slider 73 slides forward or backward of the device body 2 by the drive gear 71. The release plate 74 pivots the centering lever 55.

The drive motor 70 is driven in forward rotation or reverse rotation depending on a state of pressing of the first to third switches 22 to 24 or an instruction from a control unit, or the like, that controls the disk drive device 1. The drive motor 70 is provided with the worm 70a that engages with the drive gear 71. The drive gear 71 has a helical gear 71a, an intermediate gear 71b and a slider drive gear train 71c. The helical gear 71a engages with the worm 70a of the drive motor 70. The intermediate gear 71b engages with the helical gear 71a. The slider drive gear train 71c engages with the intermediate gear 71b and slides the slider 73 between a rear position and front position of the device body 2. These are rotatably supported on the support plate 76. The support plate 76 is screwed to the back surface of the lower half 11.

The pivot gear 72 contacts or moves away from the roller rotation mechanism 41, which drives the transport rollers 40, to switch driving of the transport rollers 40. The pivot gear 72 includes a pivot plate 72a, a roller drive gear 72b, and an operating pin 72c. The roller drive gear 72b is engaged with the pulley gear 51 of the roller rotation mechanism 41. The operating pin 72c is pivoted by the slider 73.

The pivot plate 72a is pivotably supported on the support plate 76, and the intermediate gear 71b is attached to a spindle about which the pivot plate 72a pivots. In addition, a spring anchoring piece 78 is formed at one end of the pivot plate 72a in the longitudinal direction, and one end of a coil spring 79 is anchored to the spring anchoring piece 78. The other end of the coil spring 79 is anchored to the support plate 76 to constantly pivot the pivot gear 72 in the arrow R direction in FIG. 10 to FIG. 11B.

The roller drive gear 72b is rotatably supported at one end side of the pivot plate 72a in the longitudinal direction, and is engaged with the intermediate gear 71b. Then, the roller drive gear 72b engages with the pulley gear 51 to make it possible to transmit the driving force of the drive motor 70 to the roller rotation mechanism 41 and drive the transport rollers 40 for rotation.

The operating pin 72c is formed at the other end of the pivot plate 72a, opposite via the intermediate gear 71b to one end at which the roller drive gear 72b is provided, and is placed in a region in which the slider 73 slides. Then, when the operating pin 72c is engaged with a pivot guide wall 86 of the slider 73, the operating pin 72c pivots the pivot plate 72a in the arrow R direction or in the direction opposite to the arrow R direction in accordance with the slide.

Figure 11A:
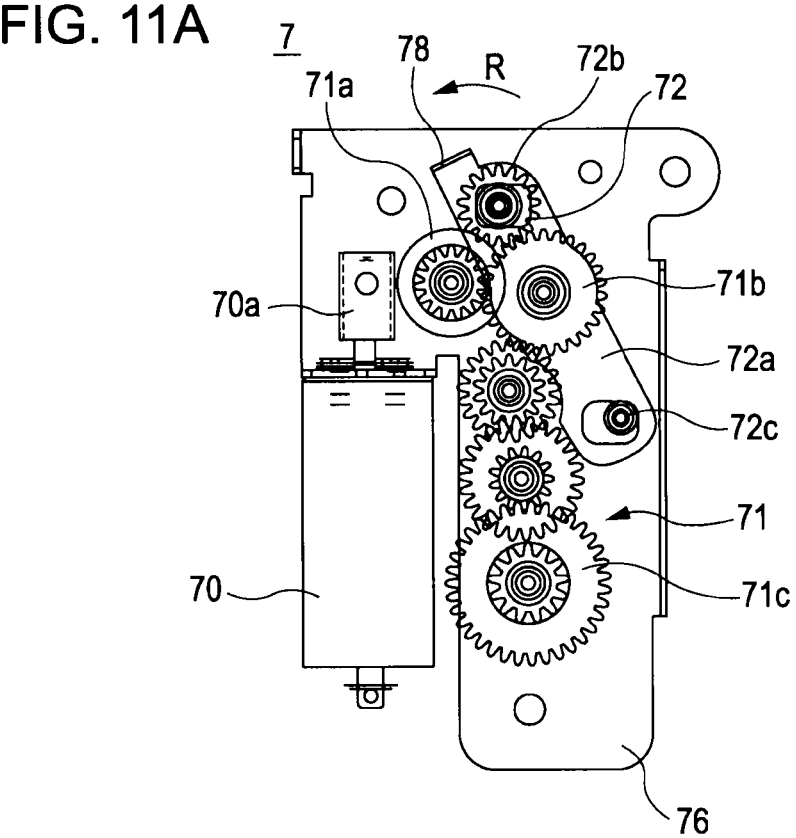
Figure 11B:
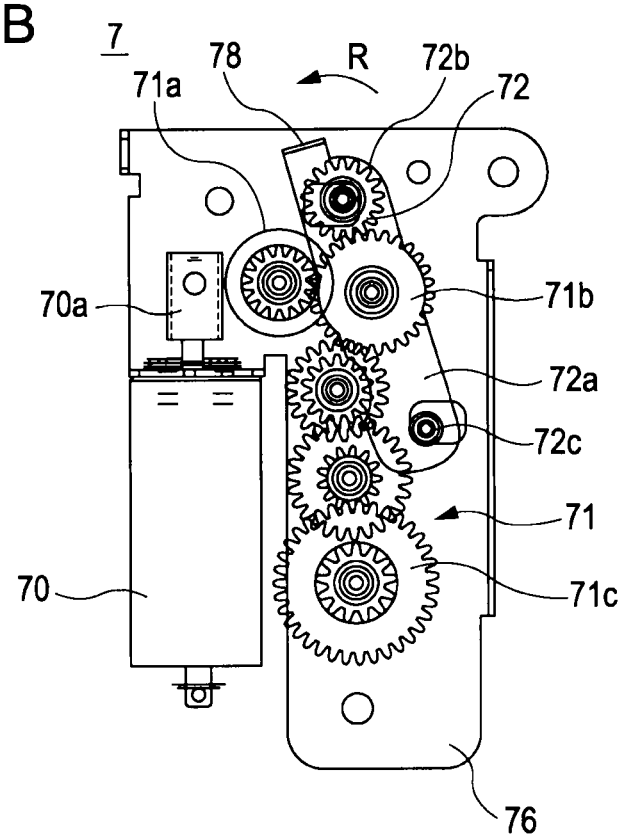

In the pivot gear 72, as the pivot plate 72a is pivoted in the arrow R direction by the coil spring 79 as shown in FIG. 11A, the roller drive gear 72b is urged to be pivoted in a direction to move away from the pulley gear 51. Then, as shown in FIG. 11B, as the slider 73 slides in the direction opposite to the arrow C direction, the operating pin 72c is operated, and then the pivot gear 72 is pivoted in the direction opposite to the arrow R direction in which the roller drive gear 72b engages with the pulley gear 51.

Figure 20:
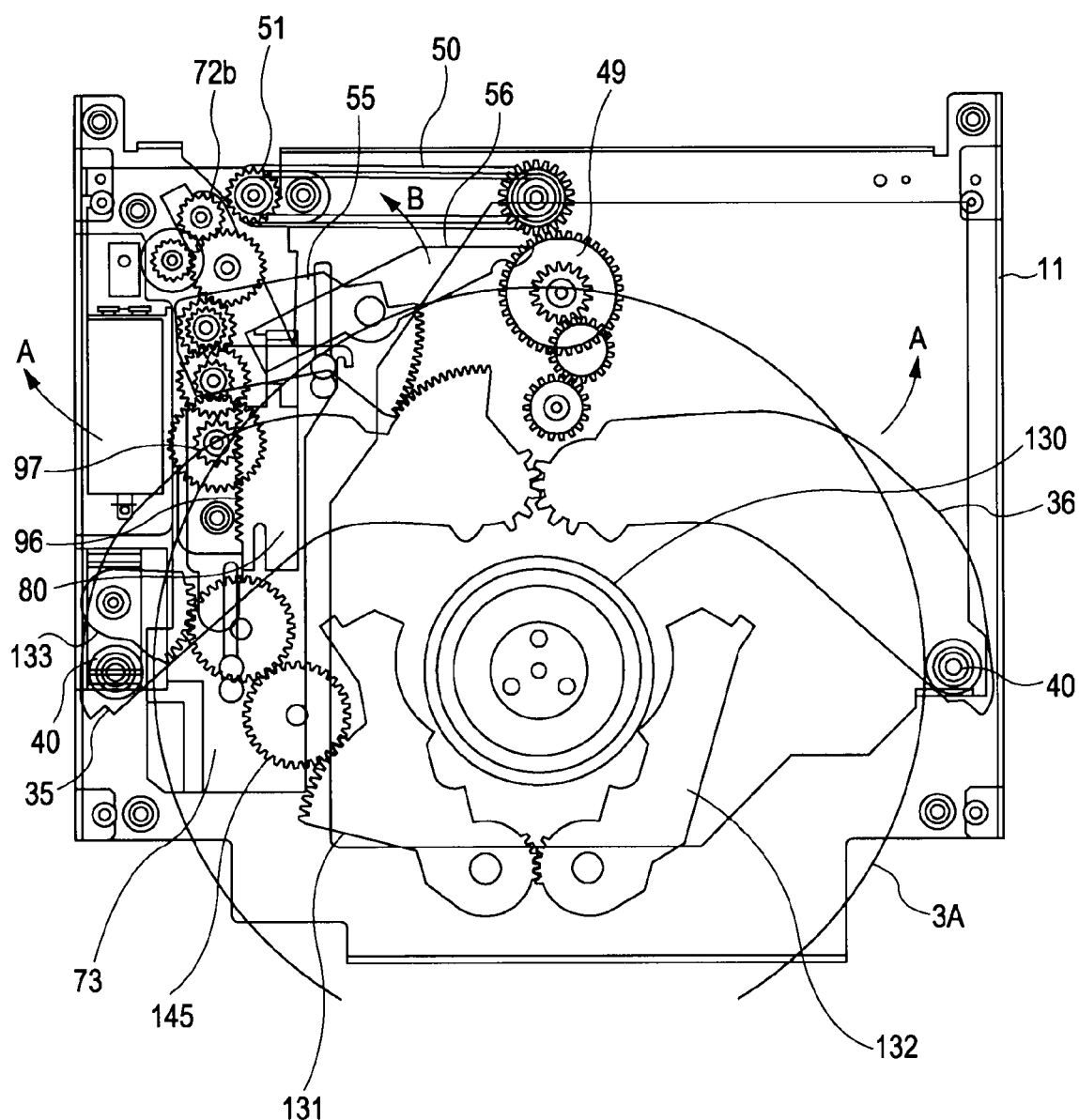
FIG. 20 is a plan view that shows the disk drive device that releases the large-diameter disk.

The slider 73 that operates the pivot gear 72 switches transmission of driving force of the drive motor 70 to the roller rotation mechanism 41, and receives the driving force of the drive motor 70 to drive the traverse unit 103 and the chucking unit 104, which will be described later. The slider 73 is a substantially rectangular member made of engineering plastics, or the like, having high sliding performance. The slider 73 is supported so that the slider 73 is slidable in the arrow C direction and in the direction opposite to the arrow C direction between the rear position of the device body 2 (FIG. 15) and the front position (FIG. 20) thereof. In addition, a sub-slider 80 is engaged with the slider 73, and is slidable in the longitudinal direction.

Figure 12:
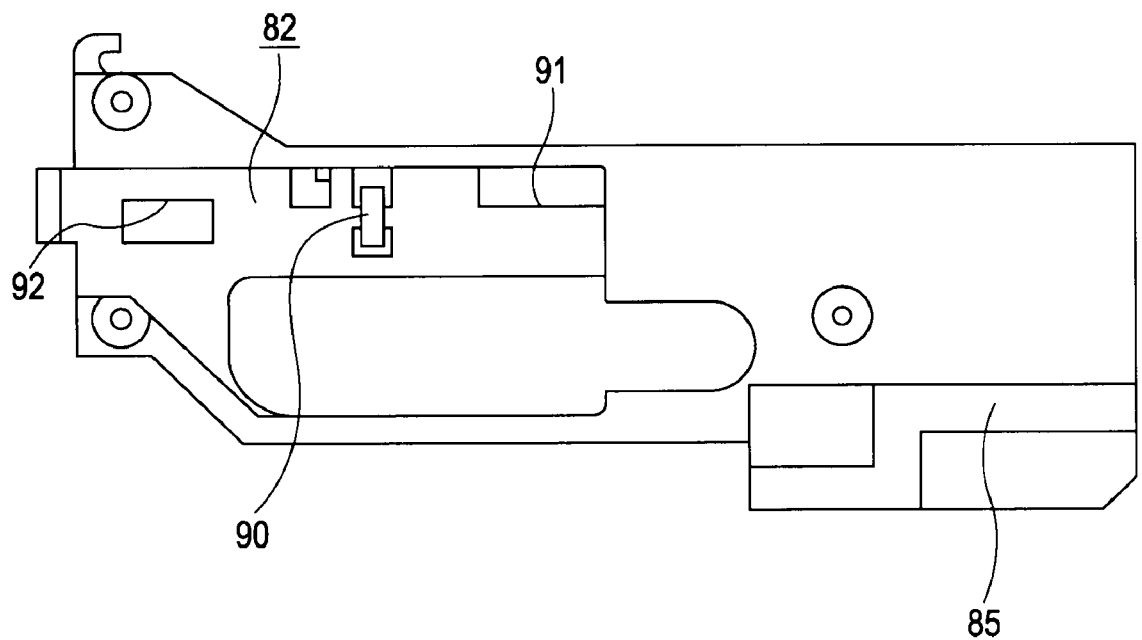
FIG. 12 is a plan view of a slider.

As shown in FIG. 10 and FIG. 12, the slider 73 has a slide support portion 82, a gear insertion hole 83, a traverse elevating portion 84, a pivot groove 85 and a pivot guide wall 86. The sub-slider 80 slides on the slide support portion 82. A slider gear 97 is provided at the distal end of the slider drive gear train 71c and is inserted in the gear insertion hole 83. The traverse elevating portion 84 raises or lowers the traverse unit 103. The pivot groove 85 pivots a chucking lever 133 of the chucking unit 104. The pivot guide wall 86 pivots the pivot plate 72a of the pivot gear 72.

The slide support portion 82 has a substantially T-shaped guide piece 90, a first insertion hole 91, and a second insertion hole 92. The guide piece 90 is inserted through the sub-slider 80. A spring anchoring piece 94 formed in the sub-slider 80 is inserted through the first insertion hole 91. An engaging protrusion 95 formed on the sub-slider 80 is inserted through the second insertion hole 92.

Here, the sub-slider 80 that is slidably supported by the slide support portion 82 will be described. The sub-slider 80 is engaged with the slider gear 97 of the slider drive gear train 71c to slide the slider 73. The sub-slider 80 is formed in a rectangular plate-like shape using engineering plastics, or the like, having high sliding performance. The sub-slider 80 includes a guide rail 93, the spring anchoring piece 94, the engaging protrusion 95, and a rack portion 96. The guide piece 90, formed on the slide support portion 82 of the slider 73, is inserted through the guide rail 93 by which sliding is guided. The spring anchoring piece 94 is inserted through the first insertion hole 91. The engaging protrusion 95 is inserted through the second insertion hole 92. The rack portion 96 engages with the slider gear 97 of the slider drive gear train 71c.

The guide rail 93 is continuous from a hole portion (not shown) which is opened in the sub-slider 80 and through which the guide piece 90 is inserted. The guide rail 93 is split to left and right portions to allow extended portions 90a extending at both sides of the guide piece 90 to slide thereon. As the guide piece 90 is engaged with the guide rail 93, the spring anchoring piece 94 and engaging protrusion 95 of the sub-slider 80 are respectively inserted through the first and second insertion holes 91 and 92.

One end of a coil spring 99 is anchored to a spring anchoring portion 98 formed on the slider 73, and the other end of the coil spring 99 is anchored to a spring anchoring piece 94. As the coil spring 99 is engaged with the spring anchoring portion 98, the sub-slider 80 is constantly urged in the arrow D direction in FIG. 10 in which the rack portion 96 moves away from the slider gear 97 of the slider drive gear train 71c. The sub-slider 80 has a pressing wall 100 that is pressed by the slider pressing pin 68 formed on the above described centering arm 56. As the pressing wall 100 is pressed by the slider pressing pin 68 of the centering arm 56 being pivoted in the arrow B direction as the optical disk 3 is drawn in, the sub-slider 80 slides in the direction opposite to the arrow D direction against the urging force of the coil spring 99. Thus, the rack portion 96 of the sub-slider 80 is engaged with the slider gear 97, and driving force of the drive motor 70 is transmitted to the slider 73.

As the sub-slider 80 is urged in the arrow D direction by the coil spring 99, the engaging protrusion 95 inserted through the second insertion hole 92 is brought into contact with a side wall of the second insertion hole 92 to restrict the sub-slider 80 from sliding in the arrow D direction, thus preventing the guide piece 90 from slipping off. Note that as the sub-slider 80 contacts a front side wall of the slide support portion 82 recessed in the slider 73, the sub-slider 80 is restricted from sliding in the direction opposite to the arrow D direction, and transmits driving force of the drive motor 70 to the slider 73.

Because the sub-slider 80 is supported by the slider 73, the rack portion 96 is placed in the gear insertion hole 83 and is engageable with the slider gear 97 of the slider drive gear train 71c that is also placed in the gear insertion hole 83. As the sub-slider 80 slides in the arrow D direction by the coil spring 99, the rack portion 96 is spaced apart from the slider gear 97. Then, as the centering arm 56 is pivoted in the arrow B direction in synchronization with drawing of the optical disk 3, the pressing wall 100 is pressed by the slider pressing pin 68 and the sub-slider 80 slides in the direction opposite to the arrow D direction, so the rack portion 96 is engaged with the slider gear 97. By so doing, the sub-slider 80 is able to slide the slider 73 in the arrow C direction. In addition, as the slider 73 slides in the direction opposite to the arrow C direction and then the slider 73 is released from the slider gear 97, the sub-slider 80 slides in the arrow D direction, so the rack portion 96 is moved away from the slider drive gear train 71c.

The gear insertion hole 83 is opened in a substantially rectangular shape in accordance with the slider drive gear train 71c, and the slider 73 is supported on the support plate 76. Thus, the slider gear 97 arranged at the distal end of the slider drive gear train 71c is inserted through the gear insertion hole 83.

The traverse elevating portion 84 is formed in one side surface 73a that faces the traverse unit 103 of the slider 73. An elevating guide pin 123 is formed on a base frame 115 of the traverse unit 103 and is inserted through the traverse elevating portion 84. The traverse elevating portion 84 raises or lowers the base frame 115 as the slider 73 slides. The traverse elevating portion 84 is formed of a groove portion formed over a range in the sliding direction of the slider 73. The traverse elevating portion 84 has a lower horizontal guide groove portion 84a, an upper horizontal guide groove portion 84b and an inclined guide groove portion 84c. The lower horizontal guide groove portion 84a guides a base chassis 108 to a chucking release position of the optical disk 3. The upper horizontal guide groove portion 84b guides the base chassis 108 to a chucking position of the optical disk 3. The inclined guide groove portion 84c connects the lower horizontal guide groove portion 84a and the upper horizontal guide groove portion 84b.

Figure 13:
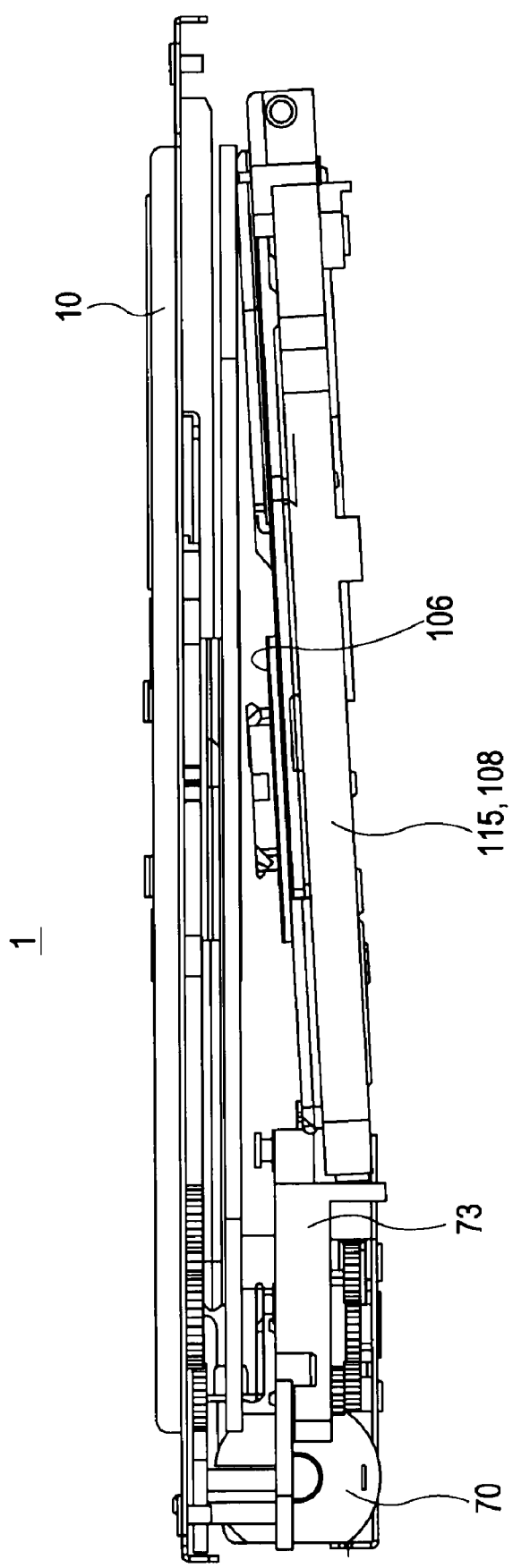
FIG. 13 is a side view that shows the disk drive device in which a base frame is lowered to a chucking release position.
Figure 14:
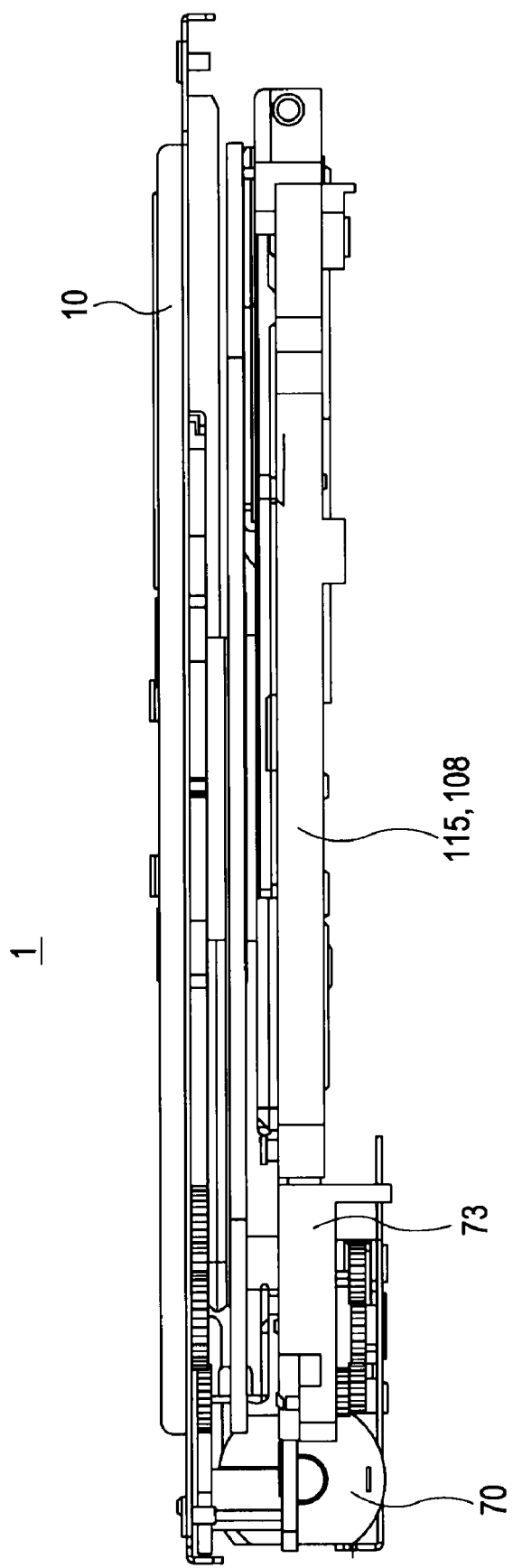
FIG. 14 is a side view that shows the disk drive device in which the base frame is raised to a chucking position.

When the traverse elevating portion 84 is placed in a state of waiting insertion of the optical disk 3, the slider 73 is slid to the rear position of the device body 2, so the traverse elevating portion 84 guides the elevating guide pin 123 of the base frame 115 to the lower horizontal guide groove portion 84a. At this time, as shown in FIG. 13, the base chassis 108 is lowered to the chucking release position at which chucking with the optical disk 3 is released. As the optical disk 3 is inserted and transported to the centering position, the slider 73 receiving driving force of the drive motor 70 slides in the arrow C direction, and then the traverse elevating portion 84 guides the elevating guide pin 123 to the upper horizontal guide groove portion 84b via the inclined guide groove portion 84c. By so doing, as shown in FIG. 14, the traverse elevating portion 84 raises the base chassis 108 from the chucking release position to the chucking position, and then the optical disk 3 is chucked by the turn table 106 and the chucking plate 130.

The pivot groove 85 pivots the chucking lever 133 that is gear-coupled to the first chucking arm 131 as the slider 73 slides, and is formed in a main surface portion 73b of the slider 73. As the slider 73 slides over a range between the rear position and front position of the device body 2, the pivot groove 85 causes the chucking lever 133 to pivot to thereby pivot the first chucking arm 131.

The pivot guide wall 86 is formed to extend from a lower surface side facing the support plate 76 of the slider 73. The slider 73 is arranged on the support plate 76 to thereby allow the pivot guide wall 86 to be engaged with the operating pin 72c of the pivot gear 72. When the slider 73 is held at the rear position, the pivot guide wall 86 presses the operating pin 72c to pivot the pivot plate 72a in the direction opposite to the arrow R direction against the urging force of the coil spring 79. By so doing, the roller drive gear 72b of the pivot gear 72 is engaged with the pulley gear 51. Then, as the optical disk 3 is transported into the device body 2, and the slider 73 is slid to the front position, the pivot guide wall 86 is moved away from the operating pin 72c. By so doing, the pivot plate 72a of the pivot gear 72 is pivoted in the arrow R direction by the urging force of the coil spring 79, and the roller drive gear 72b is moved away from the pulley gear 51.

In addition, the slider 73 has a pressing shaft 101. The pressing shaft 101 causes the release plate 74 to slide when the slider 73 slides to the front position. The pressing shaft 101 is formed on the main surface portion 73b of the slider 73 and protrudes to the upper surface of the lower half 11. Thus, the pressing shaft 101 is placed in an engaging recess 128 of the release plate 74 arranged on the lower half 11. As the slider 73 slides in the arrow C direction from the rear position to the front position, the pressing shaft 101 presses the engaging recess 128 to slide the release plate 74 in that direction, thus pivoting the centering lever 55.

Note that the slider 73 has a spring anchoring portion 102 at its one end. One end of a coil spring 109 is anchored to the rear edge lid of the lower half 11, and the other end of the coil spring 109 is anchored to the spring anchoring portion 102. By so doing, the slider 73 is constantly urged in the direction opposite to the arrow C direction, and, as the engagement between the sub-slider 80 and the slider drive gear train 71c is released, the slider 73 slides in the direction opposite to the arrow C direction and returns to the rear position.

The release plate 74 is supported at the left edge 11b side of the lower half 11 so as to be slidable in the arrow C direction, which is the sliding direction of the slider 73. The release plate 74 includes a support plate 125 and a pressing cam portion 126. The support plate 125 is supported on the lower half 11. The pressing cam portion 126 is formed to extend from the support plate 125, and is used to press the first and second release pins 60 and 61 of the centering lever 55.

The support plate 125 has guide slits 125a through which slide guide pins 127 formed on the lower half 11 are inserted. The guide slits 125a are formed in the sliding direction of the release plate 74, and the slide guide pins 127 having a width wider than a slit width are inserted through the guide slits 125a. By so doing, the release plate 74 is prevented from slipping off from the lower half 11, and is guided along the guide slits 125a to slide in the arrow C direction.

In addition, the support plate 125 has the engaging recess 128. The pressing shaft 101 provided for the slider 73 engages with the engaging recess 128. The engaging recess 128 is a U-shaped recess having two sides that are perpendicular to the sliding direction of the release plate 74 and one side in the same direction as the sliding direction of the release plate 74. The pressing shaft 101 protrudes between the two sides perpendicular to the sliding direction. Thus, as the slider 73 slides in the arrow C direction, the engaging recess 128 is pressed by the pressing shaft 101, and then the release plate 74 slides in that direction.

Note that the pressing cam portion 126 is formed at one end of the support plate 125, and a spring anchoring portion 125b is formed at the other end opposite to the one end. One end of the coil spring 129 is anchored to the rear edge 11d of the lower half 11, and the other end of the coil spring 129 is anchored to the spring anchoring portion 125b. By so doing, the release plate 74 is constantly urged in the direction opposite to the arrow C direction.

The pressing cam portion 126 is formed to extend from the support plate 125. The pressing cam portion 126 has a cam piece 126a of which the normal direction coincides with the sliding direction of the support plate 125. The cam piece 126a is placed in the loci of pivot of the first and second release pins 60 and 61 of the centering lever 55. In the pressing cam portion 126, as the support plate 125 slides in the arrow C direction, the cam piece 126a presses the first release pin 60 or the second release pin 61 to pivot in the arrow B direction.

In addition, the pressing cam portion 126 has a protruding portion 126b that protrudes to above the second lever opening portion 20 of the upper half 10. The protruding portion 126b presses the third switch 24 that is placed in the second lever opening portion 20. As the centering lever 55 is pivoted by the cam piece 126a, the protruding portion 126b depresses the third switch 24 at the same time. By so doing, the disk drive device 1 is able to detect that the optical disk 3 is released and is made rotatable.

As the first release pin 60 or the second release pin 61 is pressed by the cam piece 126a and is then pivoted in the arrow B direction, the centering lever 55 pivots the left transport arm 35, with which the centering lever 55 is engaged via the engaged gear portion 57 and the coupling gear portion 45, and the right transport arm 36, which is gear-coupled to the left transport arm 35 via the gear portions 44, in the respective arrow A directions. By so doing, the centering lever 55 is able to move the transport rollers 40 of the left and right transport arms 35 and 36 away from the outer periphery of the optical disk 3.

In addition, as the centering lever 55 is pivoted by the release plate 74 in the arrow B direction, the centering arm 56 is pressed by the restricting piece 63, and then the centering lever 55 is pivoted in that direction. Thus, the centering lever 55 is able to move the disk support portion 67 away from the outer peripheral surface of the optical disk 3.

By so doing, the release plate 74 is able to release the transport rollers 40 and the disk support portion 67 supporting the outer peripheral surface of the optical disk 3 to allow the optical disk 3 to rotate. In addition, as the slider 73 slides in the direction opposite to the arrow C direction, pressing of the release plate 74 by the pressing shaft 101 is released. This allows the centering lever 55 to pivot in the direction opposite to the arrow B direction. As the urging of the centering lever 55 by the release plate 74 in the arrow B direction is released, the left and right transport arms 35 and 36 receive the urging force of the urging spring 27 to be pivoted in the directions opposite to the arrow A directions, which are the directions in which the left and right transport arms 35 and 36 approach each other. Thus, it is possible to hold the optical disk 3 by the transport rollers 40, and it is possible to eject the optical disk 3. Note that the release plate 74 is slid by the coil spring 129 in the direction opposite to the arrow C direction.

Disk Recording and Reproducing Mechanism 8

Next, the disk recording and reproducing mechanism 8 that records and/or reproduces information signals to or from the optical disk 3 transported into the device body 2 will be described. The disk recording and reproducing mechanism 8 includes the traverse unit 103 and the chucking unit 104. The traverse unit 103 includes an optical pickup unit 105, the turn table 106 and the base chassis 108. The optical pickup unit 105 records and/or reproduces information signals to or from the optical disk 3. The optical disk 3 is rotatably placed on the turn table 106. These optical pickup unit 105 and the turn table 106 are mounted on the base chassis 108.

The base chassis 108 is a substantially rectangular frame body made of a metal. The base chassis 108 has an opening 111 that allows an objective lens of the optical pickup unit 105 to face a signal recording surface side of the optical disk 3. The opening 111 is formed in a substantially rectangular shape, and has a substantially circular arc cutout portion 112 at one end side in the longitudinal direction. In the base chassis 108, a pair of guide shafts extend in the longitudinal direction of the opening 111, and the optical pickup unit 105 supported by these guide shafts is arranged to cross over the opening 111. In addition, the circular turn table 106 and a spindle motor are arranged in the cutout portion 112 of the opening 111. The optical disk 3 is mounted on the turn table 106. The spindle motor drives the turn table 106 for rotation. In addition, the base chassis 108 has a motor arranging portion 113 in which a feed motor that transports a pickup base in the radial direction of the optical disk 3.

The base chassis 108 has a plurality of engaging pieces 116 that are engaged with the base frame 115 that is pivotably supported on the back surface of the lower half 11. As the engaging pieces 116 respectively engage with engaging protrusions 117 of the base frame 115 via dampers, the base chassis 108 is integrated with the base frame 115, and is pivotably supported on the back surface side of the lower half 11. By so doing, the base chassis 108 is placed at the upper half 10 side through the traverse opening portion 32 of the lower half 11.

The optical pickup unit 105 records or reproduces information signals to or from the optical disk 3 placed on the turn table 106. The optical pickup unit 105 includes a pickup base formed of a substantially rectangular casing. At least a light source (not shown), such as a semiconductor laser, an objective lens, a photodetector (not shown) and a drive system are arranged on the pickup base. The objective lens converges light beam, irradiated from the light source, on the signal recording surface of the optical disk 3 to irradiate the light beam. The photodetector detects returned light reflected on the recording surface of the optical disk 3. The drive system drives the objective lens in a focusing direction or tracking direction of the optical disk 3. In addition, in the optical pickup unit 105, both ends of the pickup base in the longitudinal direction are movably supported by the pair of guide shafts, and the objective lens is allowed to face the signal recording surface of the optical disk 3 through the opening 111. Note that an FPC, in which a driving circuit, or the like, that controls the drive system of the objective lens, is attached to the pickup base.

In addition, the optical pickup unit 105 has a rack member (not shown) that is provided adjacent to one of the guide shafts and that engages with a lead screw that moves the pickup base. As the lead screw is driven by the feed motor for rotation, the rack member moves along the lead screw. Thus, the pickup base is moved in the radial direction of the optical disk 3.

The turn table 106, attached to the base chassis 108, includes an engaging protrusion 121, a table 122 and a spindle motor (not shown). The engaging protrusion 121 is inserted through the center hole 3a of the optical disk 3. The surrounding portion of the center hole 3a of the optical disk 3 is placed on the table 122. The spindle motor rotates the table 122. The turn table 106 rotatably holds the optical disk 3 so that a magnet is arranged in the table 122 and is magnetically attracted to the chucking plate 130 of the chucking unit 104, which will be described later. Note that the turn table 106 is placed above the cutout portion 112 so that a substrate on which the spindle motor is mounted is attached to the base chassis 108, and the turn table 106 is moved toward or away from the chucking plate 130 as the base frame 115 is raised or lowered.

The base frame 115 supports the base chassis 108. The base frame 115 is a substantially rectangular frame body. As the base frame 115 is pivotably supported at the right edge 11c side of the back surface of the lower half 11, one side 115a of the left edge 11b side of the base frame 115 is allowed to be raised or lowered about the right edge 11c side as a pivot fulcrum. The elevating guide pin 123 is formed at the one side 115a of the left edge 11b of the lower half 11 of the base frame 115. The elevating guide pin 123 is inserted through the above described traverse elevating portion 84 of the slider 73.

When the slider 73 is located at the rear position, the elevating guide pin 123 is held by the lower horizontal guide groove portion 84a. Thus, as shown in FIG. 13, the base frame 115 lowers the base chassis 108 to the chucking release position at which the turn table 106 is moved away from the chucking plate 130. At this time, the turn table 106 recedes from a region in which the optical disk 3 is transported to thereby prevent a collision or a slide with the optical disk 3. Then, as the slider 73 slides in the arrow C direction and is moved to the front position, the elevating guide pin 123 is guided from the lower horizontal guide groove portion 84a to the upper horizontal guide groove portion 84c. Thus, as shown in FIG. 14, the base frame 115 raises the base chassis 108 to the chucking position at which the turn table 106 approaches the chucking plate 130. By so doing, in the turn table 106, the engaging protrusion 121 is inserted through the center hole 3a of the optical disk 3, and the table 122 is magnetically attracted to the chucking plate 130. In the process of ejecting the optical disk 3, the slider 73 slides from the front position to the rear position, so the elevating guide pin 123 of the base frame 115 is guided to the lower horizontal guide groove portion 84a to lower the base chassis 108 to the chucking release position.

Next, the chucking unit 104 that holds the optical disk 3 together with the turn table 106 will be described. The chucking unit 104 includes the chucking plate 130, the first and second chucking arms 131 and 132, and the chucking lever 133. The chucking plate 130 is moved toward or away from the turn table 106. The first and second chucking arms 131 and 132 support the chucking plate 130. The chucking lever 133 pivots the first chucking arm 131 in synchronization with sliding of the slider 73. As the first and second chucking arms 131 and 132 support the chucking plate 130 or release the support, the chucking unit 104 moves the chucking plate 130 toward or away from the turn table 106. By so doing, the chucking unit 104 chucks the optical disk 3 or releases chucking of the optical disk 3.

The chucking plate 130 is a substantially disc-shaped member made of engineering plastics, or the like, having high sliding performance. As shown in FIG. 2, the chucking plate 130 is supported in the plate support hole 16 of the upper half 10 by the first and second chucking arms 131 and 132. As shown in FIG. 4, a surface center portion of the lower half 11 side of the chucking plate 130 projects in a circular shape, and the chucking plate 130 has a fitting recess 135 that is fitted to the engaging protrusion 121 of the turn table 106. An iron plate 136 is arranged in the fitting recess 135, and is magnetically attracted to a magnet incorporated in the table 122. In addition, the chucking plate 130 has a taper portion 137 that is formed from the surroundings of the circular extended portion to the outer peripheral portion.

The chucking plate 130 is raised in such a manner that the taper portion 137 is held by the first and second chucking arms 131 and 132, and is maintained at a position spaced apart from the turn table 106. In addition, as the first and second chucking arms 131 and 132 are pivoted to release holding of the taper portion 137, the chucking plate 130 falls to the turn table 106 side and then the magnet arranged in the turn table 106 is magnetically attracted to the iron plate 136 arranged in the fitting recess 135. By so doing, the chucking plate 130 holds the optical disk 3 together with the turn table 106.

The first and second chucking arms 131 and 132 hold the chucking plate 130. The first and second chucking arms 131 and 132 respectively have support protrusions 138 at one end sides. The support protrusions 138 are pivotably supported in the arm support holes 17 opened in the upper half 10. The first and second chucking arms 131 and 132 have sliding pieces 139 at the distal end sides. The sliding pieces 139 are slidably anchored to the arm guide pieces 18 formed on the upper half 10. Then, the support protrusions 138 are supported in the arm support holes 17, and the sliding pieces 139 are anchored to the arm guide pieces 18. Thus, the first and second chucking arms 131 and 132 are pivotably arranged on the back surface of the upper half 10 using the support protrusions 138 as spindles.

The first and second chucking arms 131 and 132 are arranged at the left and right sides of the upper half 10 via the plate support hole 16 in which the chucking plate 130 is arranged. The first and second chucking arms 131 and 132 have edge portions 141, spring anchoring protrusions 142 and gear portions 144. The edge portions 141 are formed on opposite side surfaces and hold the taper portion 137 of the chucking plate 130. A coil spring 143 is anchored to the spring anchoring protrusions 142. The gear portions 144 are gear-coupled to each other.

The edge portions 141 are formed in a circular arc shape having a substantially equal radius of curvature to that of the taper portion 137 of the chucking plate 130, and have inclined surfaces in the same inclined directions to the inclined surface of the taper portion 137. As the first and second chucking arms 131 and 132 approach each other, the edge portions 141 slide on the lower portion of the taper portion 137 of the chucking plate 130 to raise the chucking plate 130 to thereby move the chucking plate 130 away from the turn table 106.

The spring anchoring protrusions 142 are formed adjacent to the support protrusions 138 with respect to the edge portions 141, and both ends of the coil spring 143 are anchored to the spring anchoring protrusions 142. By so doing, the first and second chucking arms 131 and 132 are pivoted and urged in the arrow E directions in FIG. 4 in which the edge portions 141 approach each other.

The gear portions 144 are formed on the outer surfaces of the one end sides at which the support protrusions 138 are provided, and are engaged with each other. Thus, the first and second chucking arms 131 and 132 are gear-coupled to each other to be synchronously pivoted.

In addition, the first chucking arm 131 arranged at the left edge 10b side of the upper half 10 has a chucking gear portion 147 that is coupled to the chucking lever 133 through a pivotal gear train 145. The pivotal gear train 145 is rotatably supported on the back surface of the upper half 10, and gear-couples the first chucking arm 131 with the chucking lever 133. Thus, as the chucking lever 133 is pivoted in synchronization with the slide of the slider 73, driving force is transmitted to the first chucking arm 131 through the pivotal gear train 145. Thus, the first and second chucking arms 131 and 132 are pivoted in the arrow E directions in which the chucking plate 130 is held or in the directions opposite to the arrow E directions in which the chucking plate 130 is released.

The chucking lever 133 pivots the first and second chucking arms 131 and 132. The chucking lever 133 includes an engaging plate portion 150, a gear plate portion 153 and a support column portion 153. The engaging plate portion 150 has an engaging protrusion 151 that engages with the pivot groove 85 of the slider 73. The gear plate portion 153 has a pivotal gear portion 152 that engages with the pivotal gear train 145. The support column portion 154 supports the engaging plate portion 150 and the gear plate portion 153 in parallel to each other.

The chucking lever 133 has an insertion hole 154a through which the support column portion 154 is extended. The chucking lever 133 is pivotably supported so that a support pin 155 formed at the left edge 11b side of the lower half 11 is inserted through the insertion hole 154a to mount the engaging plate portion 150 on the lower half 11. In addition, in the chucking lever 133, the engaging protrusion 151 protrudes to the back surface side through an opening formed in the lower half 11, and is engaged with the pivot groove 85 of the slider 73. In addition, in the chucking lever 133, the pivotal gear portion 152 formed on the side surface of the gear plate portion 153 is engaged with the pivotal gear train 145 supported on the back surface side of the upper half 10.

In the chucking unit 104, in a state where the slider 73 is slid to the rear position for waiting insertion of the optical disk 3, the first and second chucking arms 131 and 132 are pivoted by the urging force of the coil spring 143 in the arrow E directions to approach each other. At this time, as the edge portions 141 slide on the lower portion of the taper portion 137, the first and second chucking arms 131 and 132 support the chucking plate 130 upward. Note that a region in which the first and second chucking arms 131 and 132 pivot is restricted in such a manner that the sliding pieces 139 contact the side surfaces of the arm guide pieces 18.

As the optical disk 3 is transported to the centering position, and the slider 73 is slid in the arrow C direction, the chucking lever 133 of the chucking unit 104 is pivoted in such a manner that the engaging protrusion 151 is guided by the pivot groove 85. Thus, in the chucking unit 104, in synchronization with the pivot of the chucking lever 133, the first and second chucking arms 131 and 132 are pivoted via the pivotal gear train 145 in the directions opposite to the arrow E directions. By so doing, as the chucking plate 130 falls and is then magnetically attracted to the turn table 106, the chucking unit 104 rotatably chucks the optical disk 3.

To release chucking of the optical disk 3, in the chucking unit 104, the slider 73 is slid from the front position in the direction opposite to the arrow C direction, the chucking lever 133 is pivoted in the opposite direction. Thus, in the chucking unit 104, the first and second chucking arms 131 and 132 are pivoted in the arrow E directions and then the chucking plate 130 is held by the edge portions 141. Thus, the chucking plate 130 is raised and moved away from the turn table 106. At this time, the base frame 115 is also lowered to the chucking release position in synchronization with the sliding of the slider 73 in the direction opposite to the arrow C direction, so the engaging protrusion 121 of the turn table 106 recedes from the center hole 3a of the optical disk 3.

Insertion and Ejection of Optical Disk

Next, the operations of insertion and ejection of the optical disk 3 by the disk drive device 1 will be described. In a state of waiting for insertion of the optical disk 3, in the disk transport mechanism 5 of the disk drive device 1, the left and right transport arms 35 and 36 receive the urging force of the urging spring 27 and the arm bodies 42 are pivoted in the directions opposite to the arrow A directions. The transport rollers 40 are pivoted to the front surface 2a of the device body 2, and the left and right transport arms 35 and 36 are able to support the inserted end of the optical disk 3. In addition, as the left and right transport arms 35 and 36 are pivoted in the directions opposite to the arrow A directions, the centering lever 55 is pivoted in the direction opposite to the arrow B direction, and the switch pressing piece 58 depresses the first switch 22. In addition, the centering arm 56 is also pivoted in the same direction as the centering lever 55.

In addition, in a state of waiting for insertion of the optical disk 3, in the drive mechanism 7, the slider 73 is held at the rear position, and the pivot plate 72a of the pivot gear 72 is pivoted in the direction opposite to the arrow R direction against the urging force of the coil spring 79. By so doing, in the drive mechanism 7, the roller drive gear 72b is engaged with the pulley gear 51, and the driving force of the drive motor 70 is transmittable to the transport rollers 40. In addition, as the sub-slider 80 is slid in the arrow D direction, the slider 73 is moved away from the slider gear 97 of the slider drive gear train 71c, and driving force of the drive motor 70 is not transmittable to the slider 73.

In addition, as the slider 73 is held at the rear position, the elevating guide pin 123 of the base frame 115 is held at the lower horizontal guide groove portion 84*a* side of the traverse elevating portion 84, and, as shown in FIG. 13, the base frame 115 recedes downward of the lower half 11. By so doing, the optical pickup unit 105 and the turn table 106 of the base chassis 108 held by the base frame 115 recede from the region, in which the optical disk 3 is transported, on the lower half 11, thus preventing a collision or a slide with the optical disk 3. Furthermore, the first and second chucking arms 131 and 132 are pivoted in the arrow E directions to approach each other, and the chucking unit 104 holds the chucking plate 130 in the plate support hole 16 of the upper half 10.

Figure 15:
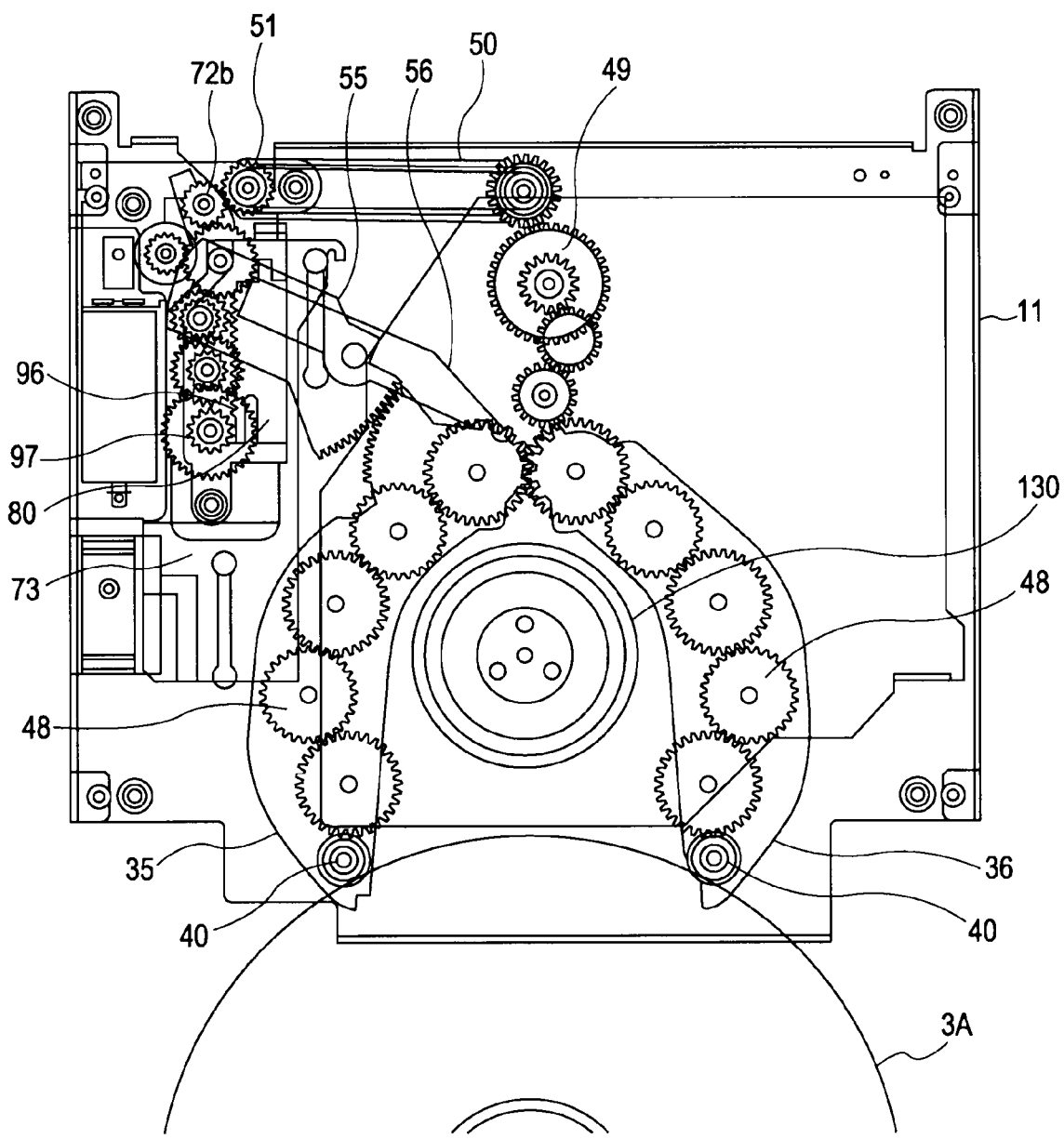
FIG. 15 is a plan view that shows the disk drive device to which a large-diameter disk is inserted.

In this insertion waiting state, as the large-diameter disk 3A is inserted, as shown in FIG. 15, the transport rollers 40 are pressed by the outer periphery of the large-diameter disk 3A to pivot the left and right transport arms 35 and 36 in the arrow A directions. As the left transport arm 35 is pivoted in the arrow A direction, the centering lever 55 is pivoted in the arrow B direction. Thus, depression of the first switch 22 by the switch pressing piece 58 is released. When release of the depression of the first switch 22 is detected, the drive motor 70 is driven and then the transport rollers 40 are driven for rotation through the pulley 50 and the roller gear train 48 in the direction to draw the large-diameter disk 3A.

Figure 16:
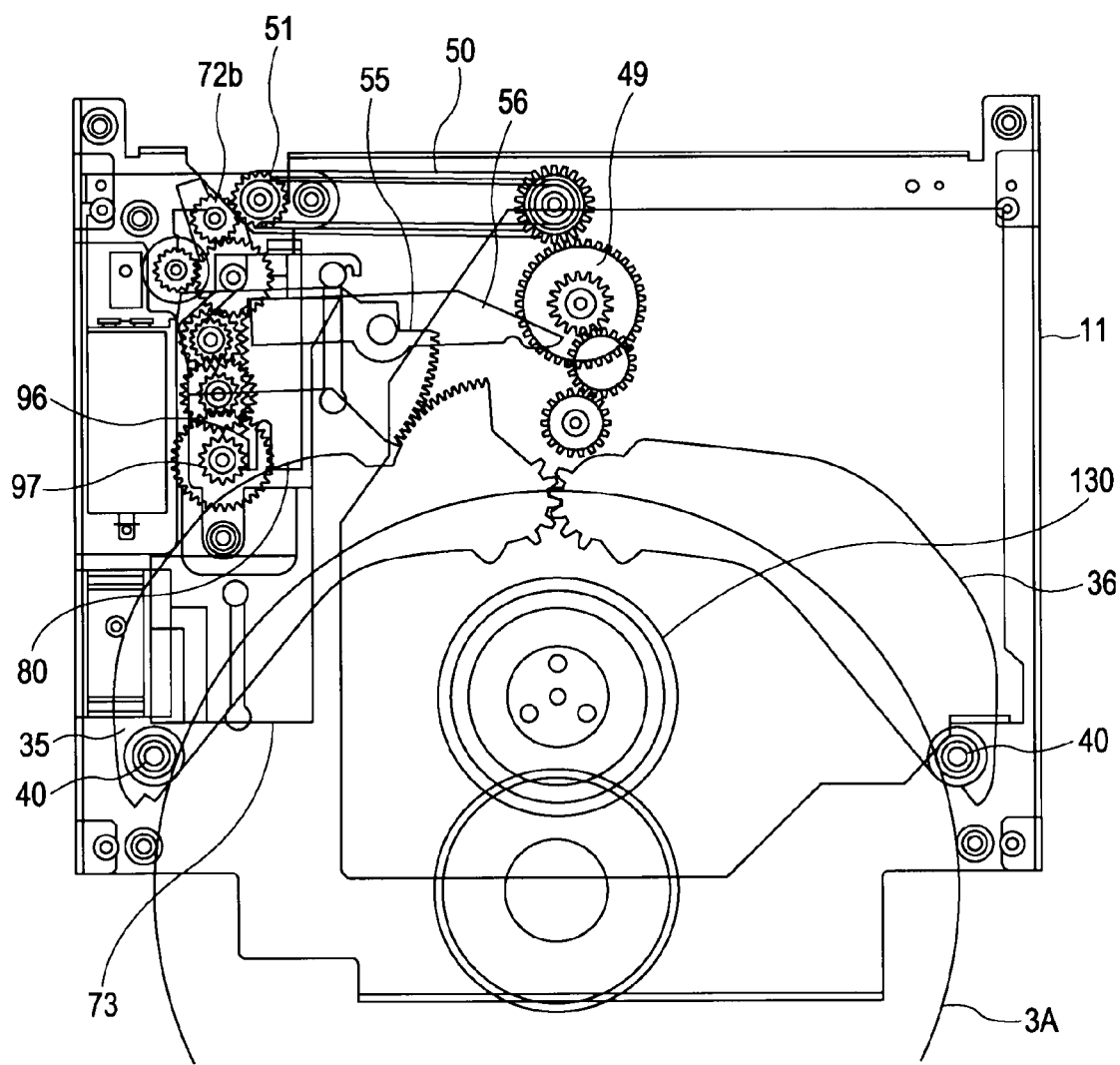
FIG. 16 is a plan view that shows the disk drive device that is transporting the large-diameter disk.

As shown in FIG. 16, as the transport rollers 40 roll on the outer peripheral surface of the large-diameter disk 3A and the large-diameter disk 3A is transported into the device body 2, the left and right transport arms 35 and 36 are further pivoted in the arrow A directions. In addition, the centering lever 55 is also pivoted in the arrow B direction as the left transport arm 35 pivots, and the centering arm 56 is also pivoted in the same direction, so the outer peripheral surface of the large-diameter disk 3A is not brought into contact with the disk support portion 67 provided at the distal end of the centering arm 56.

As shown in FIG. 17, as the large-diameter disk 3A is transported to near the centering position, the outer peripheral surface of the large-diameter disk 3A is brought into contact with the disk support portion 67, and the centering arm 56 is pressed in the arrow B direction. On the other hand, as the transport rollers 40 roll beyond the maximum outer diameter of the large-diameter disk 3A and then the left transport arm 35 is pivoted in the direction opposite to the arrow A direction, the centering lever 55 is pivoted in the direction opposite to the arrow B direction. When the centering lever 55 and the centering arm 56 pivot in the opposite directions, the centering arm 56 is restricted from pivoting by the restricting piece 63 formed on the centering lever 55. Thus, the centering arm 56 transmits the pressing force caused by the large-diameter disk 3A to the sub-slider 80 through the slider pressing pin 68. By so doing, the sub-slider 80 slides in the direction opposite to the arrow D direction against the urging force of the coil spring 99, the rack portion 96 is engaged with the slider gear 97, and driving force of the drive motor 70 is transmittable to the slider 73.

In addition, as shown in FIG. 18, as the large-diameter disk 3A is transported to the centering position, the large-diameter disk 3A is supported at three points about the center hole 3*a* by the centering arm 56 which is restricted from pivoting by the restricting piece 63 and the transport rollers 40 of the left and right transport arms 35 and 36 that are pivoted and urged in the directions opposite to the arrow A directions. Thus, the large-diameter disk 3A is held at the centering position.

In addition, the slider 73 to which driving force of the drive motor 70 is transmitted through the sub-slider 80 slides in the arrow C direction. By so doing, the pivot plate 72*a* of the pivot gear 72 is pivoted in the arrow R direction, and the roller drive gear 72*b* is moved away from the pulley gear 51. By so doing, transmission of driving force to the transport rollers 40 is interrupted, and the large-diameter disk 3A is held at the centering position.

Note that the device body 2 till then detects that the switch pressing piece 58 of the centering lever 55 depresses the second switch 23 and the large-diameter disk 3A is inserted.

In addition, as the slider 73 slides in the arrow C direction, the elevating guide pin 123 inserted through the traverse elevating portion 84 is guided from the lower horizontal guide groove portion 84*a* through the inclined guide groove portion 84*c* to the upper horizontal guide groove portion 84*b*. By so doing, the base frame 115 is raised from the chucking release position to the chucking position, the turn table 106 of the traverse unit 103 supported by the base frame 115 is raised into the disk transport region and inserted through the center hole 3*a*.

Figure 19:
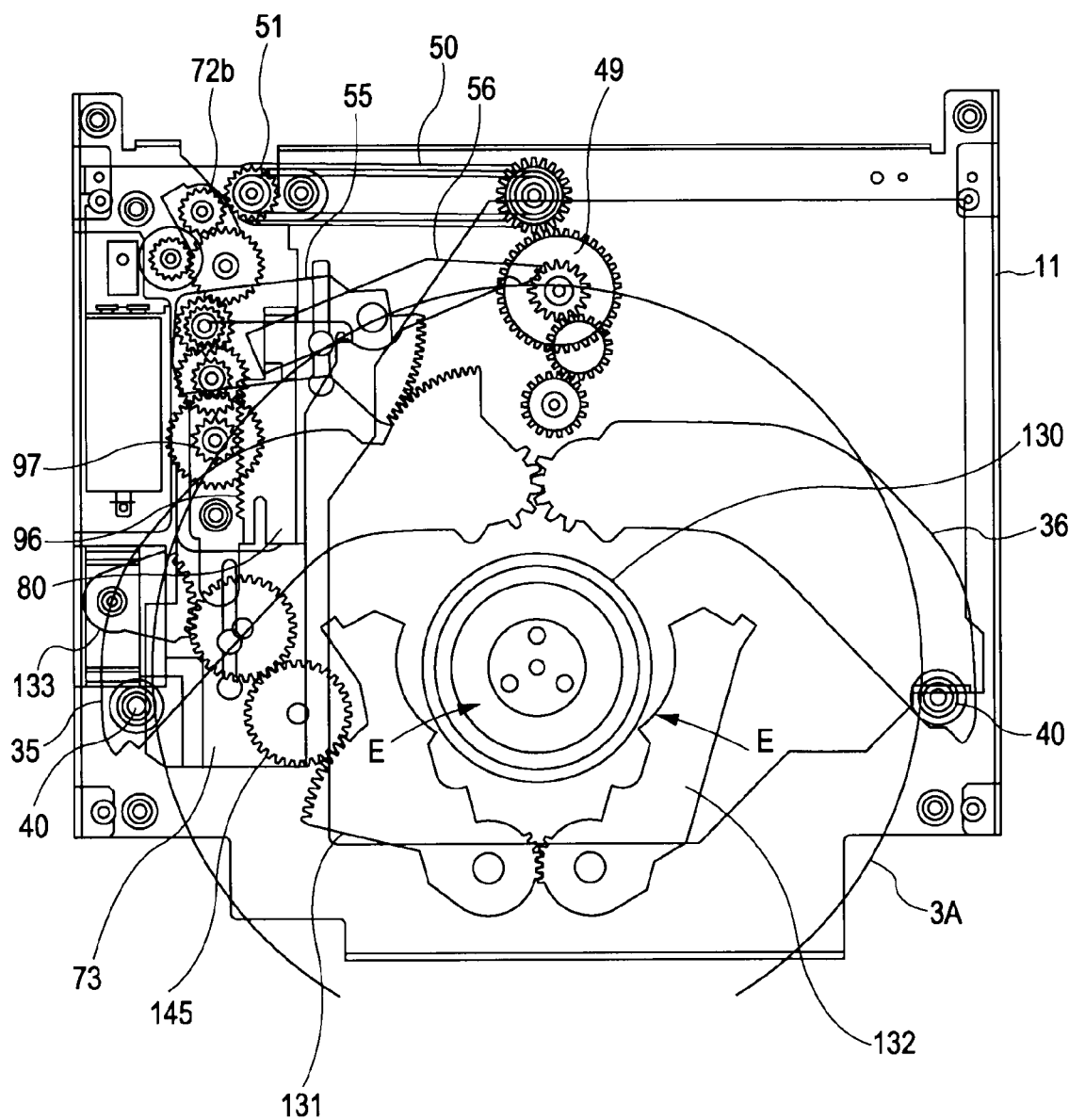
FIG. 19 is a plan view that shows the disk drive device that chucks the large-diameter disk.

In addition, as the slider 73 slides in the arrow C direction, the slider 73 pivots the chucking lever 133 engaged with the pivot guide wall 86. As the chucking lever 133 is pivoted, the first chucking arm 131 that is gear-coupled to the chucking lever 133 and the second chucking arm 132 that is gear-coupled to the first chucking arm 131 are pivoted in the directions opposite to the arrow E directions in FIG. 19 to move away from each other against the urging force of the coil spring 143. By so doing, the chucking plate 130 supported by the first and second chucking arms 131 and 132 falls onto the turn table 106 and is electromagnetically coupled to the turn table 106, thus holding the large-diameter disk 3A together with the turn table 106.

Furthermore, as the slider 73 slides in the arrow C direction and moves to the front position, the pressing shaft 101 that protrudes from the upper surface of the lower half 11 slides the release plate 74 in the same direction. When the first release pin 60 of the centering arm 56 is pivoted to the region in which the pressing cam portion 126 slides, and when the release plate 74 slides in the arrow C direction, the release plate 74 presses the first release pin 60. By so doing, in the centering arm 56, the disk support portion 67 is pivoted in the arrow B direction in FIG. 20 and is moved away from the outer periphery of the large-diameter disk 3A. In addition, as the centering arm 56 is pivoted in the arrow B direction, the centering lever 55 is also pivoted through the restricting piece 63 in the same direction. Thus, the left transport arm 35 that is gear-coupled by the coupling gear portion 45 and the right transport arm 36 that is gear-coupled to the left transport arm 35 are pivoted in the arrow A directions in FIG. 20. Thus, the transport rollers 40 provided for the transport arms 35 and 36 are moved away from the outer peripheral surface of the large-diameter disk 3A.

As the outer peripheral portion of the large-diameter disk 3A is released and is made rotatable, the release plate 74 depresses the third switch 24 by the protruding portion 126*b* to allow detection of a state where the large-diameter disk 3A is rotatable. As the third switch 24 is depressed, the device body 2 stops driving the drive motor 70.

As information signals are recorded and/or reproduced to or from the large-diameter disk 3A and then a disk ejection instruction is issued, the drive motor 70 is rotated in reverse direction, the sub-slider 80 moves in the arrow D direction and then the slider 73 is slid in the direction opposite to the arrow C direction. As the slider 73 is slid in the direction opposite to the arrow C direction, the chucking lever 133 pivots in the opposite direction. Thus, the first and second chucking arms 131 and 132 are pivoted in the arrow E directions to approach each other, and the chucking plate 130 is supported in the plate support hole 16 of the upper half 10. In addition, as the slider 73 is slid in the direction opposite to the arrow C direction, the elevating guide pin 123 that is guided by the upper horizontal guide groove portion 84b of the traverse elevating portion 84 is moved to the lower horizontal guide groove portion 84a, and the base frame 115 moves from the chucking position to the chucking release position. Furthermore, as the slider 73 is slid in the direction opposite to the arrow C direction, pressing on the release plate 74 is released. Thus, the centering arm 56 and the left and right transport arms 35 and 36 are respectively pivoted and returned. As a result, the disk support portion 67 and the transport rollers 40 hold the outer peripheral portion of the large-diameter disk 3A.

As the slider 73 is slid to the rear position, engagement between the rack portion 96 and slider gear 97 of the sub-slider 80 is released. Then, the slider 73 is slid in the direction opposite to the arrow C direction by the coil spring 109 anchored to the spring anchoring portion 102. Thus, the slider gear 97 is moved away from the rack portion 96 of the sub-slider 80. By so doing, sliding of the slider 73 is stopped.

As the slider 73 is slid to the rear position, the pivot plate 72a of the pivot gear 72 is pivoted in the direction opposite to the arrow R direction, and the roller drive gear 72b engages with the pulley gear 51. Thus, driving force of the drive motor 70 is transmitted to the transport rollers 40, and the transport rollers 40 are driven for rotation in the directions in which the large-diameter disk 3A is ejected. As the transport rollers 40 roll on the outer peripheral portion of the large-diameter disk 3A, the left and right transport arms 35 and 36 receives the urging force of the urging spring 27 and are pivoted in the directions opposite to the arrow A directions toward the front surface 2a of the device body 2. The large-diameter disk 3A is ejected from the disk insertion and ejection portion 4 of the device body 2, and is transported to a position at which the center hole 3a is placed outside. By so doing, the center hole 3a and outer peripheral portion of the large-diameter disk 3A may be grasped, and may be handled without touching the recording surface. As the left and right transport arms 35 and 36 are pivoted toward the front surface 2a of the device body 2, the switch pressing piece 58 of the centering lever 55 depresses the first switch 22. By so doing, the device body 2 is able to detect that the large-diameter disk 3A is ejected, and stops driving the drive motor 70.

Figure 21:
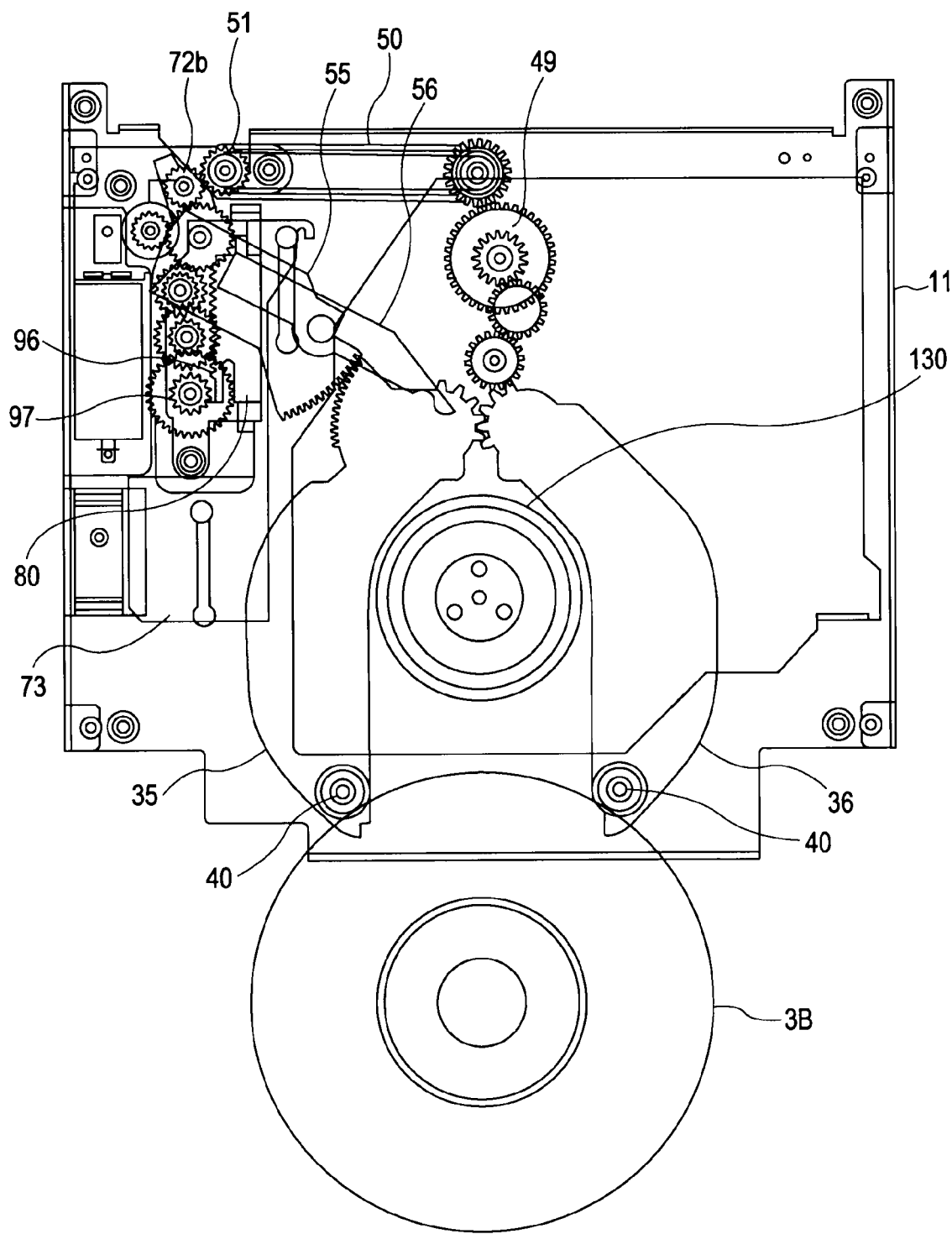
FIG. 21 is a plan view that shows the disk drive device to which a small-diameter disk is inserted.

Next, in the above described insertion waiting state, the operations of the case where the small-diameter disk 3B is inserted will be described. As the small-diameter disk 3B is inserted in the insertion waiting state, as shown in FIG. 21, the transport rollers 40 are pressed by the outer periphery of the small-diameter disk 3B, and the left and right transport arms 35 and 36 are pivoted in the arrow A directions. By so doing, as in the case of the insertion of the above large-diameter disk 3A, the centering lever 55 is pivoted in the arrow B direction, release of depression of the first switch 22, driving of the drive motor 70 and drawing of the small-diameter disk 3B by the transport rollers 40 are carried out.

Figure 22:
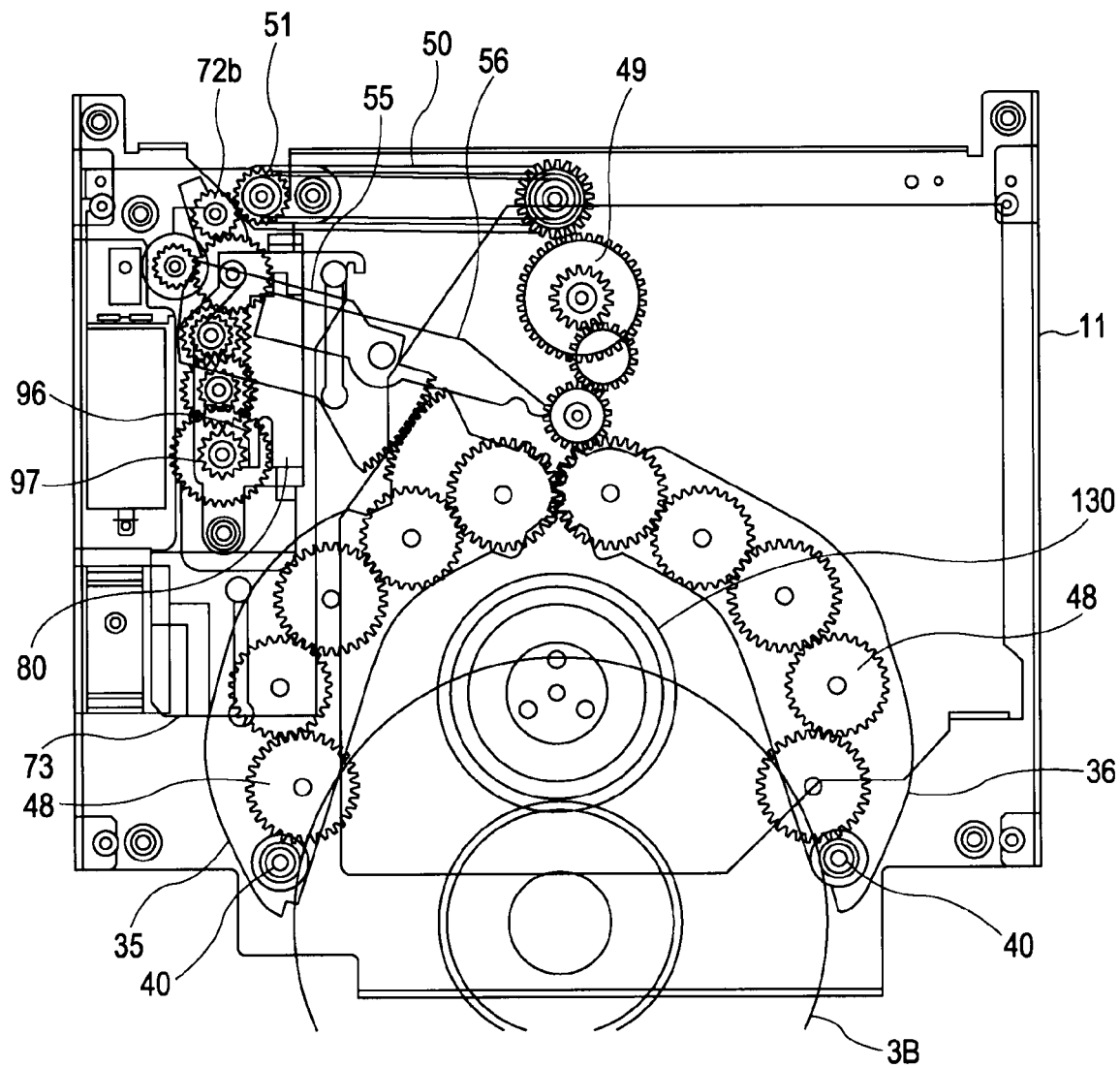
FIG. 22 is a plan view that shows the disk drive device that is transporting the small-diameter disk.

As shown in FIG. 22, as the transport rollers 40 roll on the outer peripheral surface of the small-diameter disk 3B and the small-diameter disk 3B is transported into the device body 2, the left and right transport arms 35 and 36 are further pivoted in the arrow A directions. In addition, the centering lever 55 is also pivoted in the arrow B direction as the left transport arm 35 pivots, and the centering arm 56 is also pivoted in the same direction, so the outer peripheral surface of the small-diameter disk 3B is not brought into contact with the disk support portion 67 provided at the distal end of the centering arm 56.

Figure 23:
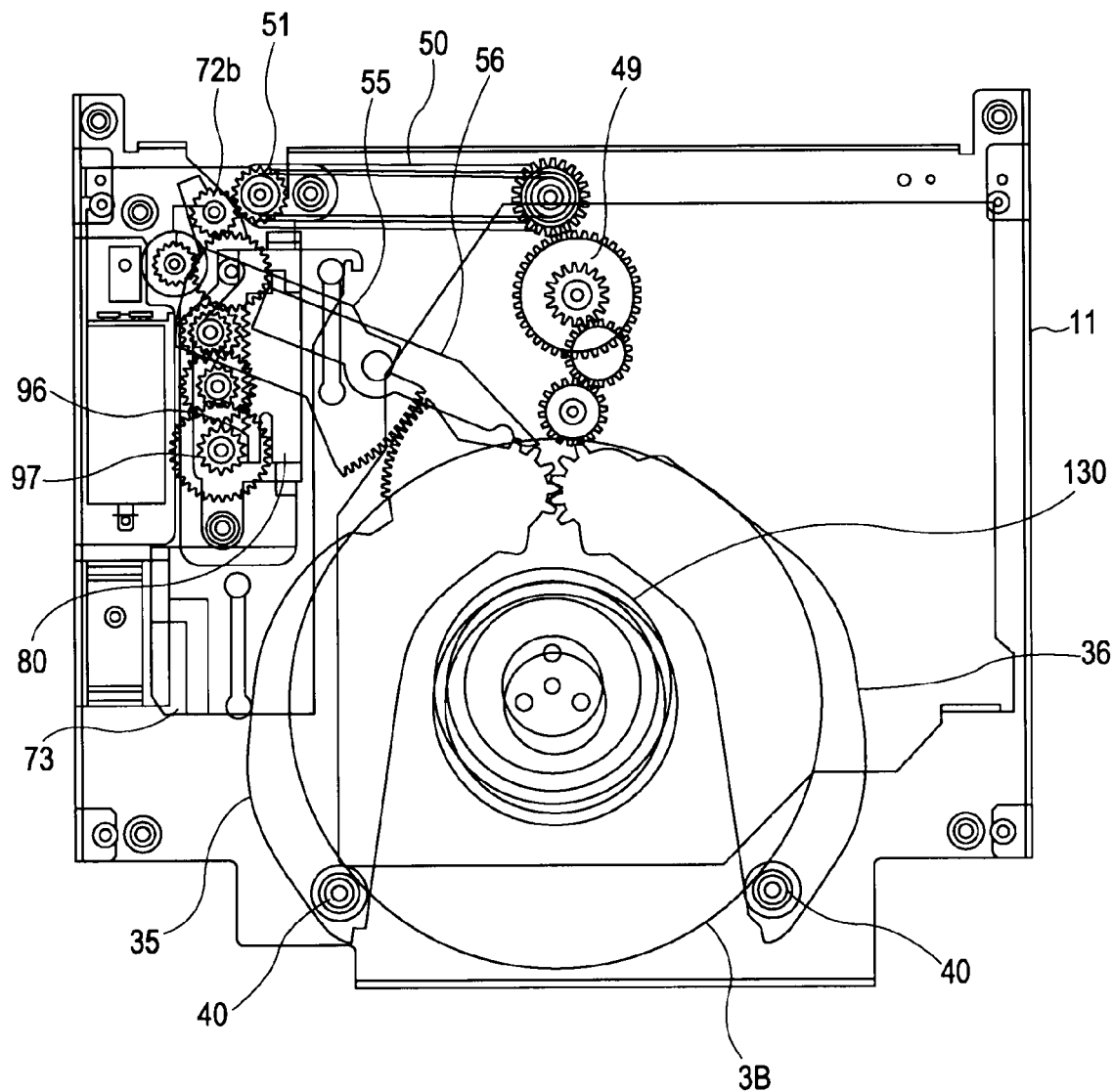
FIG. 23 is a plan view that shows the disk drive device in which the pivot of the centering arm is restricted.

As shown in FIG. 23, as the small-diameter disk 3B is transported to near the centering position, the outer peripheral surface of the small-diameter disk 3B is brought into contact with the disk support portion 67, and the centering arm 56 is pressed in the arrow B direction. On the other hand, as the transport rollers 40 roll beyond the maximum outer diameter of the small-diameter disk 3B and then the left transport arm 35 is pivoted in the direction opposite to the arrow A direction, the centering lever 55 is pivoted in the direction opposite to the arrow B direction. When the centering lever 55 and the centering arm 56 pivot in the opposite directions, the centering arm 56 is restricted from pivoting by the restricting piece 63 formed on the centering lever 55. Thus, the centering arm 56 transmits the pressing force caused by the small-diameter disk 3B to the sub-slider 80 through the slider pressing pin 68. By so doing, the sub-slider 80 slides in the direction opposite to the arrow D direction against the urging force of the coil spring 99, the rack portion 96 is engaged with the slider gear 97, and driving force of the drive motor 70 is transmittable to the slider 73.

In addition, as shown in FIG. 24, as the small-diameter disk 3B is transported to the centering position, the small-diameter disk 3B is supported at three points about the center hole 3a by the centering arm 56 that is restricted from pivoting by the restricting piece 63 and the transport rollers 40 of the left and right transport arms 35 and 36 that are pivoted and urged in the directions opposite to the arrow A directions. Thus, the small-diameter disk 3B is held at the centering position.

In addition, the slider 73 to which driving force of the drive motor 70 is transmitted through the sub-slider 80 slides in the arrow C direction. By so doing, in the device body 2, the pivot plate 72a of the pivot gear 72 is pivoted in the arrow R direction, and transmission of driving force to the transport rollers 40 is interrupted. In addition, as in the case of the insertion of the large-diameter disk 3A, in the device body 2, the base frame 115 is raised to the chucking position as the slider 73 slides, and support of the chucking plate 130 is released. Thus, the small-diameter disk 3B is held by the turn table 106 and the chucking plate 130.

Figure 25:
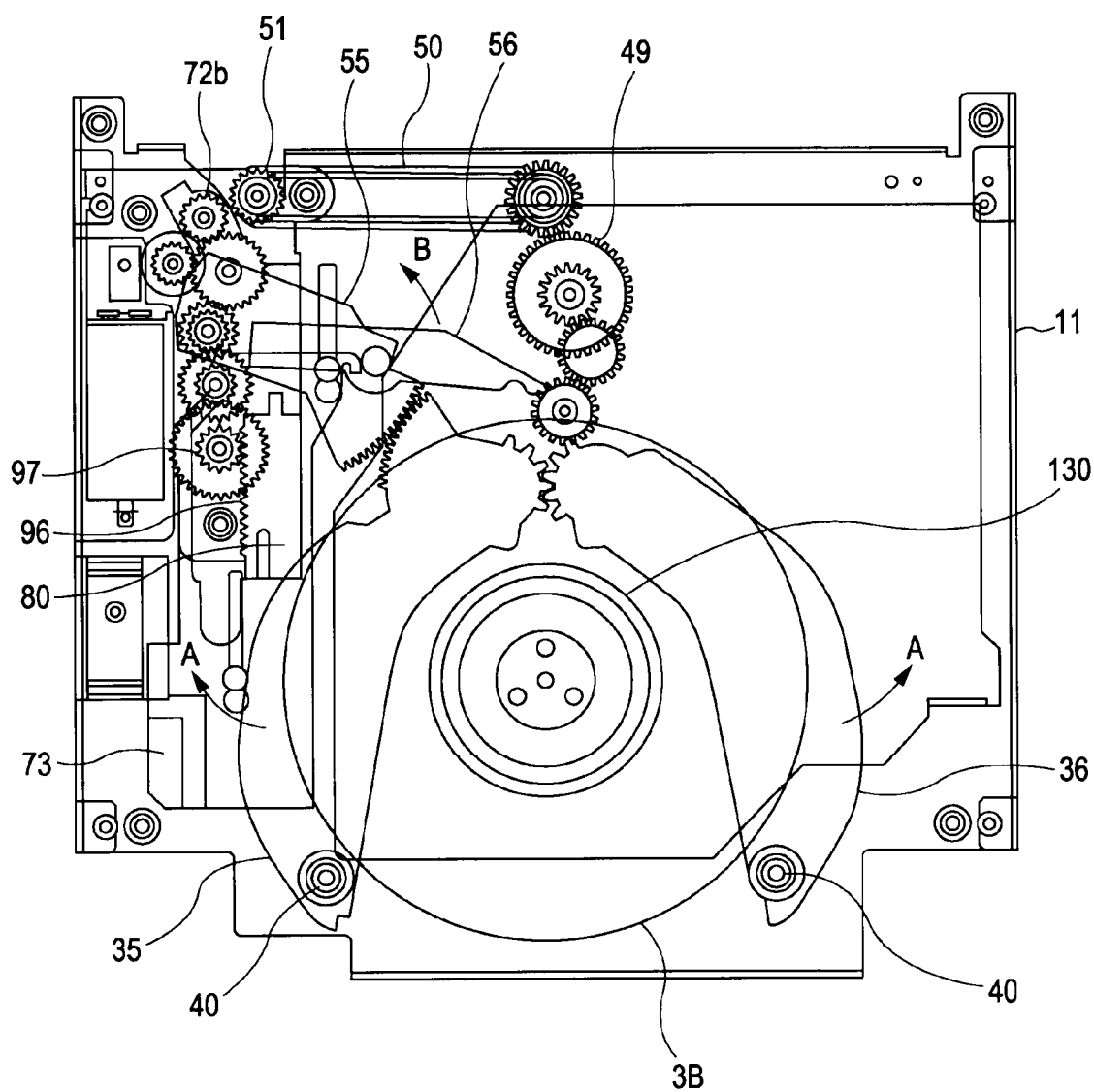
FIG. 25 is a plan view that shows the disk drive device that releases the small-diameter disk.
Figure 26:
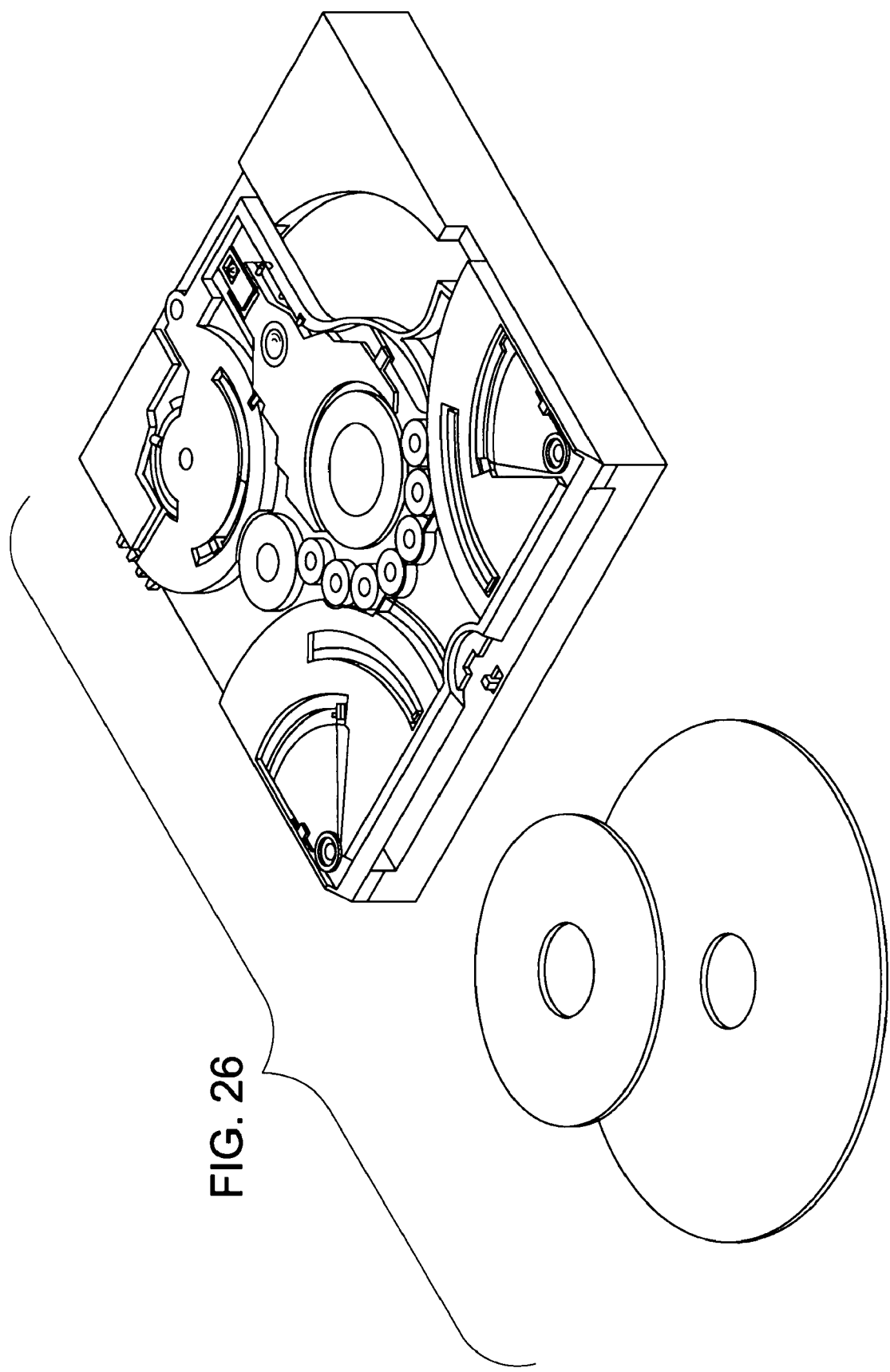
FIG. 26 is an external perspective view that shows an existing disk drive device.
Figure 27B:
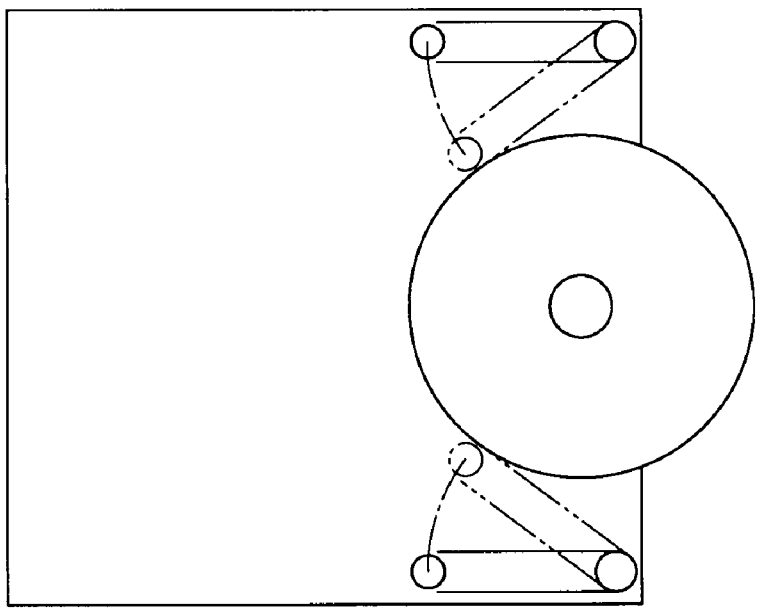
Figure 27A:
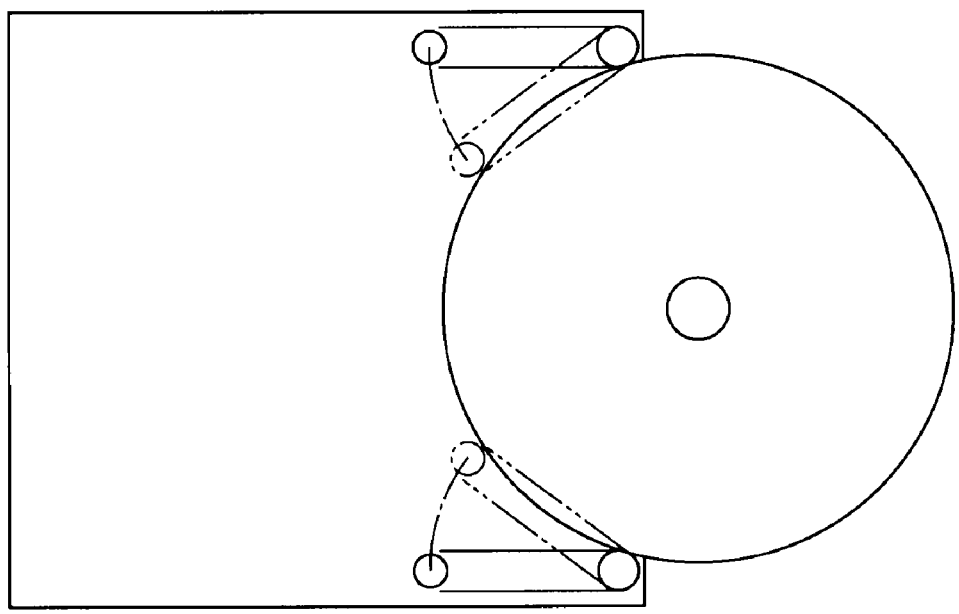
Figure 28:
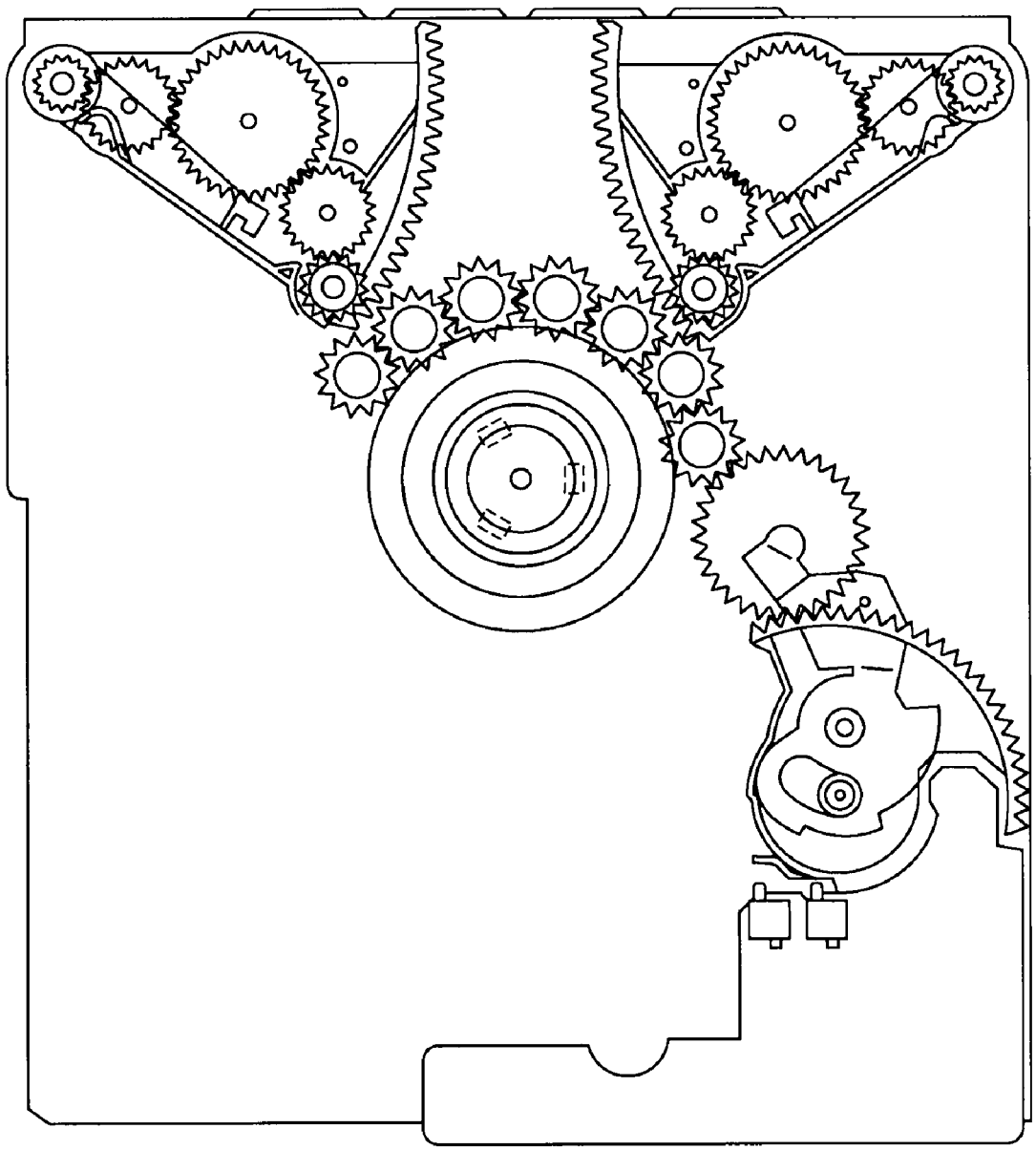
FIG. 28 is a plan view that shows an inside of the existing disk drive device.

Furthermore, in the device body 2, the slider 73 slides the release plate 74 in the arrow C direction. As the second release pin 61 of the centering arm 56 is pivoted to the region in which the pressing cam portion 126 slides, the release plate 74 slides to the arrow C direction to press the second release pin 61. By so doing, in the centering arm 56, the disk support portion 67 is pivoted in the arrow B direction in FIG. 25 and is moved away from the outer periphery of the small-diameter disk 3B. In addition, as the centering arm 56 is pivoted in the arrow B direction, the centering lever 55 is also pivoted through the restricting piece 63 in the same direction. Thus, the left transport arm 35, which is gear-coupled by the coupling gear portion 45, and the right transport arm 36, which is gear-coupled to the left transport arm 35, are pivoted in the arrow A directions in FIG. 25. Thus, the transport rollers 40 provided for the transport arms 35 and 36 are moved away from the outer peripheral surface of the small-diameter disk 3B.

As the outer peripheral portion of the small-diameter disk 3B is released and is made rotatable, the release plate 74 depresses the third switch 24 by the protruding portion 126b to allow detection of a state where the small-diameter disk 3B is rotatable. As the third switch 24 is depressed, the device body 2 stops driving the drive motor 70.

Note that the device body 2 does not detect depression of the second switch 23 by the switch pressing piece 58 of the centering lever 55, so the device body 2 determines that the small-diameter disk 3B is inserted. As information signals are recorded and/or reproduced to or from the small-diameter disk 3B and then a disk ejection instruction is issued, the drive motor 70 is rotated in reverse direction, the sub-slider 80 moves in the arrow D direction and then the slider 73 slides in the direction opposite to the arrow C direction. Thereafter, through a process similar to the ejection of the above described large-diameter disk 3A, the left and right transport arms 35 and 36 are pivoted toward the front surface 2a of the device body 2, and the small-diameter disk 3B is ejected.

At this time, the left and right transport arms 35 and 36 are supported at the rear edge side of the device body 2, and the transport rollers 40 that support the outer peripheral surface of the small-diameter disk 3B are pivoted toward the front surface 2a, so the disk drive device 1 is able to reliably eject the small-diameter disk 3B to a position at which the center hole 3a is placed outside.

The present application contains subject matter related to that disclosed in Japanese Priority Patent Application JP 2008-214502 filed in the Japan Patent Office on Aug. 22, 2008 and Japanese Priority Patent Application JP 2008-214503 filed in the Japan Patent Office on Aug. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disk drive device comprising:
a device body having a front surface that forms a disk insertion and ejection opening, a disk being inserted to or ejected from the front surface;
a pair of arms that are supported at proximal end portions thereof pivotally from the front surface of the device body to a downstream side in a disk insertion direction in which the disk is inserted;
transport rollers that are respectively rotatably supported at distal ends of the pair of arms and that transport the disk to an inside or outside of the device body by being brought into contact with a side surface of the disk;
an urging member that urges the pair of arms so that the transport rollers supported respectively by the pair of arms approach each other; and
a transport roller rotation mechanism that drives at least one of the transport rollers, supported respectively by the pair of arms, for rotation, wherein the pair of arms synchronously pivot the transport rollers in such a manner that the pivotally supported proximal end portions are coupled to each other.

2. The disk drive device according to claim 1, wherein the pair of arms are coupled to each other so that the proximal end portions synchronize with each other.

3. The disk drive device according to claim 2, wherein the pair of arms respectively have gear portions formed at the proximal end portions, and the gear portions are engaged with each other.

4. The disk drive device according to claim 1, wherein the pair of arms are pivoted over a range between a front surface side of the device body at which the transport rollers are located adjacent to each other and the downstream side in the disk insertion direction at which the transport rollers are spaced apart from each other.

5. An electronic apparatus comprising:
an apparatus body on which a disk drive device is mounted, wherein
the disk drive device includes
a device body having a front surface that forms a disk insertion and ejection opening, a disk being inserted to or ejected from the front surface;
a pair of arms that are supported at proximal end portions thereof pivotally from the front surface of the device body to a downstream side in a disk insertion direction in which the disk is inserted;
transport rollers that are respectively rotatably supported at distal ends of the pair of arms and that transport the disk to an inside or outside of the device body by being brought into contact with a side surface of the disk;
an urging member that urges the pair of arms so that the transport rollers supported respectively by the pair of arms approach each other; and
a transport roller rotation mechanism that drives at least one of the transport rollers, supported respectively by the pair of arms, for rotation, and wherein
the pair of arms synchronously pivot the transport rollers in such a manner that the pivotally supported proximal end portions are coupled to each other.

6. A disk drive device comprising:
a device body having a front surface that forms a disk insertion and ejection portion, a disk being inserted to or ejected from the front surface;
a pair of arms that are supported at proximal end portions thereof pivotally from the front surface of the device body to a downstream side in a disk insertion direction in which the disk is inserted; and
a centering member that is pivotally supported at the downstream side in the disk insertion direction and that centers the disk, wherein
the pivotally supported proximal end portions of the pair of arms are coupled to each other, and the centering member is coupled to at least any one of the pair of arms.

7. The disk drive device according to claim 6, wherein
the pair of arms are coupled to each other so that the proximal end portions synchronize with each other, and
the centering member is coupled to at least any one of the proximal end portions so that the centering member synchronizes with the proximal end portions.

8. The disk drive device according to claim 7, wherein
the pair of arms are coupled to each other so that gear portions formed respectively at the proximal end portions are engaged with each other, and
the centering member is coupled to the at least any one of the pair of arms so that a gear train is engaged with a coupling gear portion formed in at least any one of the pair of arms.

9. The disk drive device according to claim 7, wherein the centering member and the pair of arms support the disk at centering positions corresponding to disks having large and small different diameters.

10. An electronic apparatus comprising:
an apparatus body on which a disk drive device is mounted, wherein
the disk drive device includes
a device body having a front surface that forms a disk insertion and ejection portion, a disk being inserted to or ejected from the front surface;
a pair of arms that are supported at proximal end portions thereof pivotally from the front surface of the device body to a downstream side in a disk insertion direction in which the disk is inserted; and
a centering member that is pivotally supported at the downstream side in the disk insertion direction and that centers the disk, and wherein
the pivotally supported proximal end portions of the pair of arms are coupled to each other, and the centering member is coupled to at least any one of the pair of arms.

\* \* \* \* \*